(12) United States Patent
Brady et al.

(10) Patent No.: US 6,647,372 B1
(45) Date of Patent: Nov. 11, 2003

(54) METHOD AND APPARATUS FOR USING PRIOR ACTIVITIES TO IMPROVE THE PROBABILITY OF COMPLETING TRANSACTIONS FOR A CUSTOMER IN A RETAIL ENVIRONMENT

(75) Inventors: James T. Brady, San Jose, CA (US); Scott W. Slinker, San Jose, CA (US)

(73) Assignee: Forecourt Communications Group, San Jose, CA (US)

( * ) Notice: Subject to any disclaimer, the term of this patent is extended or adjusted under 35 U.S.C. 154(b) by 0 days.

(21) Appl. No.: 09/453,188

(22) Filed: Dec. 2, 1999

(51) Int. Cl.⁷ .............................................. G06F 17/60
(52) U.S. Cl. .............................. 705/14; 705/16; 705/18
(58) Field of Search ............................... 705/1, 14, 16, 705/18

(56) References Cited

U.S. PATENT DOCUMENTS

| | | | |
|---|---|---|---|
| 4,872,113 A | 10/1989 | Dinerstein | 364/401 |
| 5,305,197 A | 4/1994 | Axler et al. | 364/401 |
| 5,353,218 A | 10/1994 | De Lapa et al. | 364/401 |
| 5,369,571 A | 11/1994 | Metts | 364/401 |
| 5,459,306 A * | 10/1995 | Stein et al. | 235/383 |
| 5,502,636 A | 3/1996 | Clarke | 364/401 |
| 5,761,648 A | 6/1998 | Golden et al. | 705/14 |
| 5,956,693 A * | 9/1999 | Geerlings | 705/14 |
| 6,073,112 A * | 6/2000 | Geerlings | 705/14 |
| 6,195,426 B1 * | 2/2001 | Bolduc et al. | 379/266 |
| 6,334,108 B1 * | 12/2001 | Deaton et al. | 705/14 |
| 2002/0103705 A1 * | 8/2002 | Brady | 705/14 |

FOREIGN PATENT DOCUMENTS

EP        0991006 A2 *  4/2000
WO       WO 97/23838 A1 *  7/1997

OTHER PUBLICATIONS

Hagel et al: "Who will benefit from virtual information?"; McKinsey Quarterly, 1996, n3, pp. 22–37.*

* cited by examiner

*Primary Examiner*—Edward R. Cosimano
(74) *Attorney, Agent, or Firm*—Ohlandt, Greeley, Ruggiero & Perle, L.L.P.

(57) ABSTRACT

Apparatus, and a corresponding method, present to a customer various forms of information (product, brand . . . ) during periods where the customer is idle. A signal indicating the start or impending start of idle time is used to present to the customer various offers in a series of interactions between a computer interface and the customer. The interactions are planned based on previously acquired information about the customer, the current transaction, the venue of the transaction, the time of day and the date of the transaction, and the history of prior customer activities. The method of the invention enables a system of computers to collect information about the characteristics of a customer in a retail, banking or service establishment utilizing a point-of-sale terminal, which has input and output devices that the customer can use to communicate with the system of computers for identification purposes and to select from various options presented to the customer. The information concerning the customer's activities are accumulated and analyzed such that the resulting information can be used to improve the efficiency of the customer's next interaction with the system in the same or different venues. The efficiency increase results from a fitting of a set of possible activities into the idle time, in such a manner as to select a set of activities and their order that will provide the highest value likelihood that the customer will complete each activity.

12 Claims, 33 Drawing Sheets

Fig. 1. Overview

Fig. 6. Point-of-Sale Terminal 50

Fig. 7. Customer Interface 22

Fig. 11. Store Setup and Update 900

| Field Name | Rows in Data Table | | | | ID # |
|---|---|---|---|---|---|
| Customer ID | | | ... | | 222 |
| Customer Name | | | ... | | 226 |
| Address | | | ... | | 228 |
| Date of Creation | | | ... | | 230 |
| Date of Profile Update | | | ... | | 232 |

Fig. 12

| Field Name | Rows in Data Table | ID # |
|---|---|---|
| Customer ID | ... | 242 |
| Store Id | ... | 246 |
| Date of Last Update | ... | 248 |
| Date Created | ... | 250 |
| Mean Think Time | ... | 252 |
| Std. Deviation of Think Time | ... | 254 |
| Number of Think Time Samples | ... | 256 |
| Repeat below Monthly | ... | |
|   Repeat below Daily | ... | |
|     Repeat for Morning, Mid-day and Evening | ... | |
|       Mean Idle Time | ... | 264 |
|       Std. Deviation of Idle Time | ... | 266 |
|       Number of Idle Time Samples | ... | 268 |
|       1st most likely Activity ID | ... | 270 |
|       2nd most likely Activity ID | ... | 272 |
|       3rd most likely Activity ID | ... | 274 |
|     End Morning, Mid-day and Evening Repeat | ... | |
|   End Daily Repeat | ... | |
| End Monthly Repeat | ... | |

Fig. 13

| Field Name | Rows in Data Table | ID # |
|---|---|---|
| Customer ID | ... | 292 |
| Store Id | ... | 294 |
| Mean Think Time | ... | 296 |
| Std. Deviation of Think Time | ... | 298 |
| Repeat below Monthly | ... | |
|   Repeat below Daily | ... | |
|     Repeat for Morning, Mid-day and Evening | ... | |
|       Mean Idle Time | ... | 306 |
|       Std. Deviation of Idle Time | ... | 308 |
|       1st most likely Activity ID | ... | 310 |
|       2nd most likely Activity ID | ... | 312 |
|       3rd most likely Activity ID | ... | 314 |
|     End Morning, Mid-day and Evening Repeat | ... | |
|   End Daily Repeat | ... | |
| End Monthly Repeat | ... | |

Fig. 14

| Field Name | Rows in Data Table | | | | ID # |
|---|---|---|---|---|---|
| Card ID | | | ... | | 332 |
| Customer Name | | | ... | | 334 |
| Customer ID | | | ... | | 336 |

Fig. 15

| Field Name | Rows in Data Table | | | | ID # |
|---|---|---|---|---|---|
| Store ID | | | ... | | 342 |
| Store Type | | | ... | | 343 |
| Corporate ID | | | ... | | 344 |
| Franchisee ID | | | ... | | 346 |

Fig. 16

Fig. 17. Idle Time Message 360

| Field Name | Rows in Data Table | | | | ID # |
|---|---|---|---|---|---|
| Message Type (Idle Time) | | | ... | | 361 |
| Message ID (Start of Idle Time or End of Idle Time) | | | ... | | 362 |
| Point-of-sale Terminal ID | | | ... | | 364 |

Fig. 18. Screen Instrumentation Message 370

| Field Name | ID # |
|---|---|
| Record Type Flag (for Screen Instrumentation) | 372 |
| Customer ID | 374 |
| Store ID | 378 |
| Point-of-sale Terminal ID | 380 |
| Session Number | 382 |
| Screen ID | 384 |
| Screen Size | 386 |
| Time Stamp | 388 |

Fig. 19. Customer Selection Instrumentation Message 390

| Field Name | ID # |
|---|---|
| Record Type (for Customer Selection Instrumentation) | 392 |
| Customer ID | 394 |
| Store ID | 398 |
| Point-of-sale Terminal ID | 400 |
| Session Number | 402 |
| Screen ID | 404 |
| Selection ID | 406 |
| Time Stamp | 408 |

Fig. 20. Instrumentation Table 410

| Field Name | Rows in Data Table | | | ID # |
|---|---|---|---|---|
| Record Type Flag (Screen or Customer Selection) | | | ... | 412 |
| Customer ID | | | ... | 414 |
| Store ID | | | ... | 418 |
| Point-of-sale Terminal ID | | | ... | 420 |
| Session Number | | | ... | 422 |
| Screen ID | | | ... | 424 |
| Screen Size | | | ... | 426 |
| Month | | | ... | 428 |
| Day-of-week | | | | 430 |
| Time | | | ... | 432 |
| Time-of-day (Morning, Mid-day, Evening...) | | | ... | 434 |

Fig. 21. Profile Generation Instrumentation Table 440

| Field Name | Rows in Data Table | | | ID # |
|---|---|---|---|---|
| Record Type Flag (Screen or Customer Selection) | | | ... | 442 |
| Customer ID | | | ... | 444 |
| Store ID | | | ... | 448 |
| Point-of-sale Terminal ID | | | ... | 450 |
| Session Number | | | ... | 452 |
| Activity ID | | | ... | 454 |
| Screen Size | | | ... | 456 |
| Month | | | ... | 460 |
| Day-of-week | | | | 462 |
| Time | | | ... | 464 |
| Time-of-day (Morning, Mid-day, Evening...) | | | ... | 466 |

| Field Name | Rows in Data Table | | | | ID # |
|---|---|---|---|---|---|
| Point-of-sale Terminal ID | | | ... | | 502 |
| Point-of-sale Terminal Type (Standard, Express..) | | | ... | | 503 |
| Screen ID | | | ... | | 504 |

Fig. 22

| Field Name | Rows in Data Table | ID # |
|---|---|---|
| Store ID | ... | 512 |
| Point-of-Sale Terminal ID | ... | 514 |
| Date Created | ... | 516 |
| Date of Last Update | ... | 518 |
| Mean Think Time | ... | 520 |
| Std. Deviation of Think Time | ... | 522 |
| Number of Think Time Samples | ... | 524 |
| Repeat below Monthly | ... | |
|   Repeat below Daily | ... | |
|     Repeat for Morning, Mid-day and Evening | ... | |
|       Mean Idle Time | ... | 532 |
|       Std. Deviation of Idle Time | ... | 534 |
|       Number of Idle Time Samples | ... | 536 |
|       1st most likely Activity ID | ... | 538 |
|       2nd most likely Activity ID | ... | 540 |
|       3rd most likely Activity ID | ... | 542 |
|     End Morning, Mid-day and Evening Repeat | ... | |
|   End Daily Repeat | ... | |
| End Monthly Repeat | ... | |
| Home Screen ID | ... | 550 |
| Percent On Time Completion | ... | 554 |

Fig. 23

Fig. 24. Customer Session Table 560

| Field Name | Rows in Data Table | | | ID # |
|---|---|---|---|---|
| Point-of-sale Terminal ID | | | ... | 562 |
| Session Number | | | ... | 564 |
| Customer ID | | | ... | 566 |
| Expected Idle Time | | | ... | 570 |
| 1st most likely Activity ID | | | ... | 572 |
| 2nd most likely Activity ID | | | ... | 574 |
| 3rd most likely Activity ID | | | ... | 576 |

Fig. 25. Time-of-day Conversion Table 580

| Field Name | Rows in Data Table | | | ID # |
|---|---|---|---|---|
| Time Morning Starts | | | ... | 582 |
| Time Mid-day Starts | | | ... | 584 |
| Time Evening Starts | | | ... | 586 |

Fig. 26. Proposed Activity List 590

| Field Name | Rows in Data Table | | | ID # |
|---|---|---|---|---|
| Activity ID | | | ... | 592 |
| Expected System Response Time | | | ... | 594 |
| Expected Std. Deviation of System Response Time | | | ... | 596 |
| Activity Value | | | ... | 598 |

Fig. 27. Activity Table 600

| Field Name | Rows in Data Table | | | ID # |
|---|---|---|---|---|
| Activity Dialog ID | | | ... | 602 |
| Screen ID | | | ... | 604 |
| Activity Value | | | ... | 608 |
| Activity Type (Ad, Information, Product, Service...) | | | ... | 610 |
| Activity Price | | | ... | 612 |

*Fig. 28. Screen Definition Table 800*

| Field Name | Rows in Data Table | | | | ID # |
|---|---|---|---|---|---|
| Screen ID | | | ... | | 802 |
| X Dimension | | | ... | | 804 |
| Y Dimension | | | ... | | 806 |
| Repeat below for Each Sub-screen Element | | | ... | | |
|    Element ID | | | ... | | 808 |
| End Sub-screen Element Repeat | | | ... | | |

*Fig. 29. Text Element Table 820*

| Field Name | Rows in Data Table | | | | ID # |
|---|---|---|---|---|---|
| Text Element ID | | | ... | | 822 |
| Text Element Flag | | | ... | | 824 |
| X Position | | | ... | | 826 |
| Y Position | | | ... | | 828 |
| Font | | | ... | | 830 |
| Style | | | ... | | 832 |
| Length | | | ... | | 834 |
| Text | | | ... | | 836 |

*Fig. 30. Graphic Element Table 840*

| Field Name | Rows in Data Table | | | | ID # |
|---|---|---|---|---|---|
| Graphic Element ID | | | ... | | 842 |
| Graphic Element Flag | | | ... | | 844 |
| X Position | | | ... | | 846 |
| Y Position | | | ... | | 848 |
| Graphic's Type | | | ... | | 850 |
| Size | | | ... | | 852 |
| Graphic | | | ... | | 854 |

Fig. 31. Touch Element 860 Table

| Field Name | Rows in Data Table | | | ID # |
|---|---|---|---|---|
| Touch Element ID | | | ... | 862 |
| Touch Element Flag | | | ... | 864 |
| X1 Coordinate | | | ... | 866 |
| Y1 Coordinate | | | ... | 868 |
| X2 Coordinate | | | ... | 870 |
| Y2 Coordinate | | | ... | 872 |
| Selection ID | | | ... | 874 |

Fig. 32. Key Pad Element Table 880

| Field Name | Rows in Data Table | | | ID # |
|---|---|---|---|---|
| Key Pad Element ID | | | ... | 882 |
| Key Pad Element Flag | | | ... | 884 |
| Key ID | | | ... | 886 |
| Selection ID | | | ... | 874 |

Fig. 33. Activity Work Table 900

| Field Name | Rows in Data Table | | | ID # |
|---|---|---|---|---|
| Activity ID | | | ... | 902 |
| Count | | | ... | 904 |
| Month | | | ... | 906 |
| Day of Week | | | ... | 907 |
| Time of Day | | | ... | 908 |

Fig. 34. Store Configuration Table 910

| Field Name | Rows in Data Table | | | ID # |
|---|---|---|---|---|
| Store ID | | | ... | 912 |
| Next Session Number | | | ... | 914 |
| System Response Time | | | ... | 916 |
| Std. Deviation of System Response Time | | | ... | 918 |
| Total of Response Times | | | ... | 920 |
| Sum of Square of Response Times | | | ... | 922 |
| Number of Samples | | | ... | 924 |

Fig. 35. System Response Time Work Table 930

| Field Name | Rows in Data Table | | | ID # |
|---|---|---|---|---|
| Point-of-sale Terminal ID | | | ... | 932 |
| Time of Last Customer Response Instrumentation Signal | | | ... | 934 |
| Time of Last Screen Instrumentation Signal | | | ... | 936 |
| Number of Samples | | | ... | 938 |
| Total of Response Times | | | ... | 940 |
| Sum of Square of Response Times | | | ... | 942 |
| System Response Time | | | ... | 944 |

Activity Diagrams

*Fig. 36. Customer Session 1000*

| Field Name | Shop | Wait For Check-out | Unload Shopping Cart | Wait for Checker | Check out Idle Time | Make Pay-ment | Bagging Idle Time | End Of Session |
|---|---|---|---|---|---|---|---|---|
| ID # | 1002 | 1004 | 1006 | 1008 | 1010 | 1012 | 1014 | 1016 |

*Fig. 37. Customer Idle Time 1020*

| Field Name | Activity 1 | Activity 2 | ... | Activity n |
|---|---|---|---|---|
| ID # | 1022 | 1022 | 1022 | 1022 |

*Fig. 38. Customer Activity Cycle 1030*

| Field Name | Action 1 | Action 2 | ... | Action n |
|---|---|---|---|---|
| ID # | 1032 | 1032 | 1032 | 1032 |

*Fig. 39. Customer Action Cycle 1040*

| Field Name | Think Time | Enter Response | System Response Time | Present Action Alternatives |
|---|---|---|---|---|
| ID # | 1042 | 1044 | 1046 | 1048 |

Flow Charts
Fig. 40. Detecting Start & End of Idle Time 1060
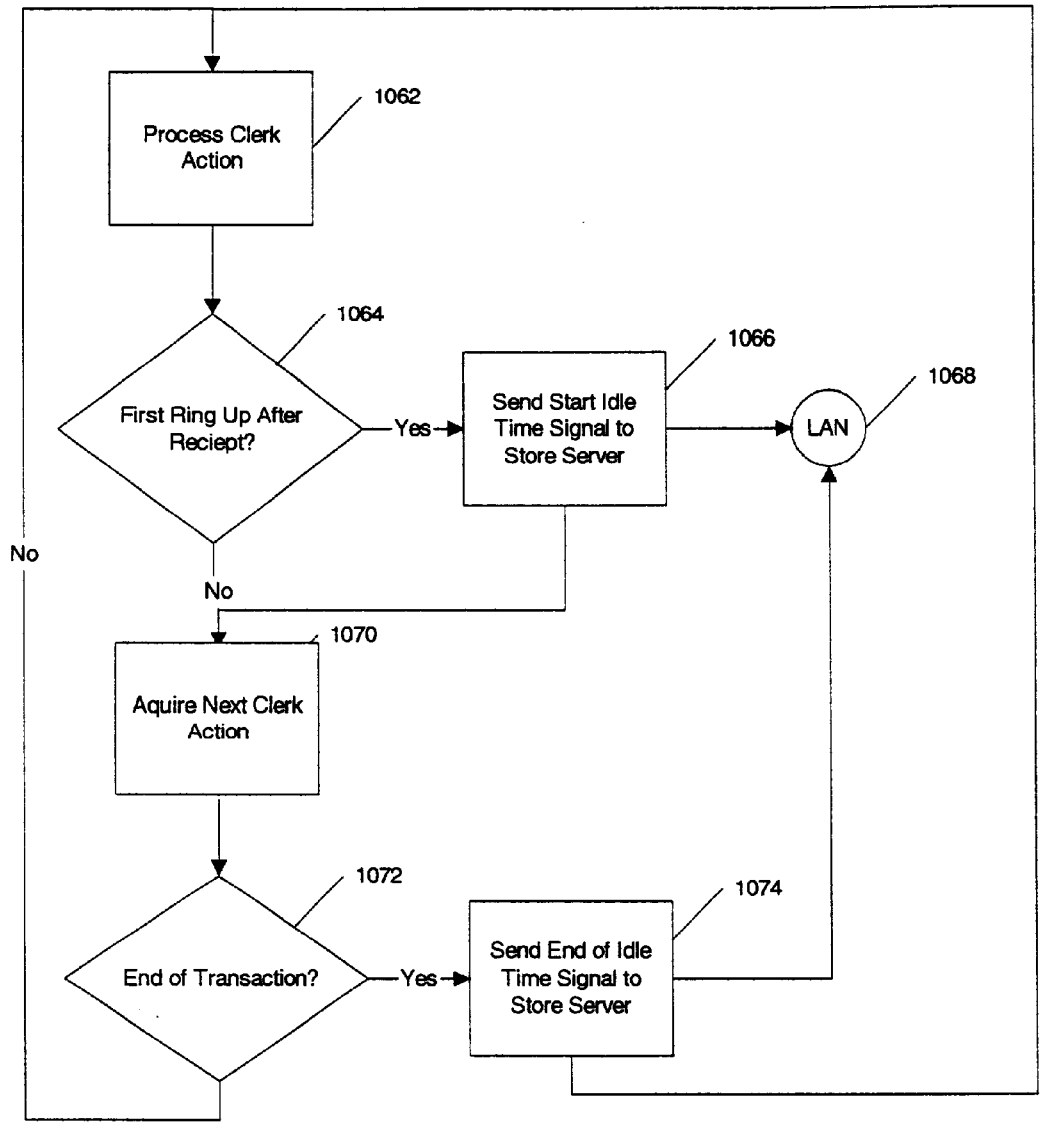

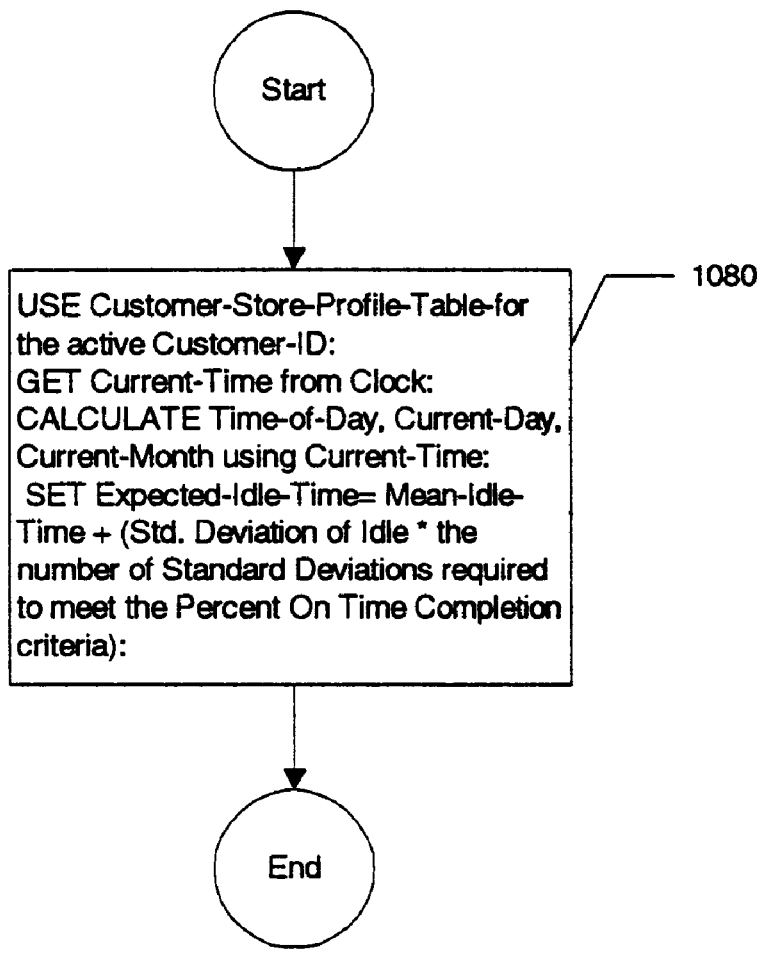
Fig. 41. Calculation of Expected Idle Time 1080

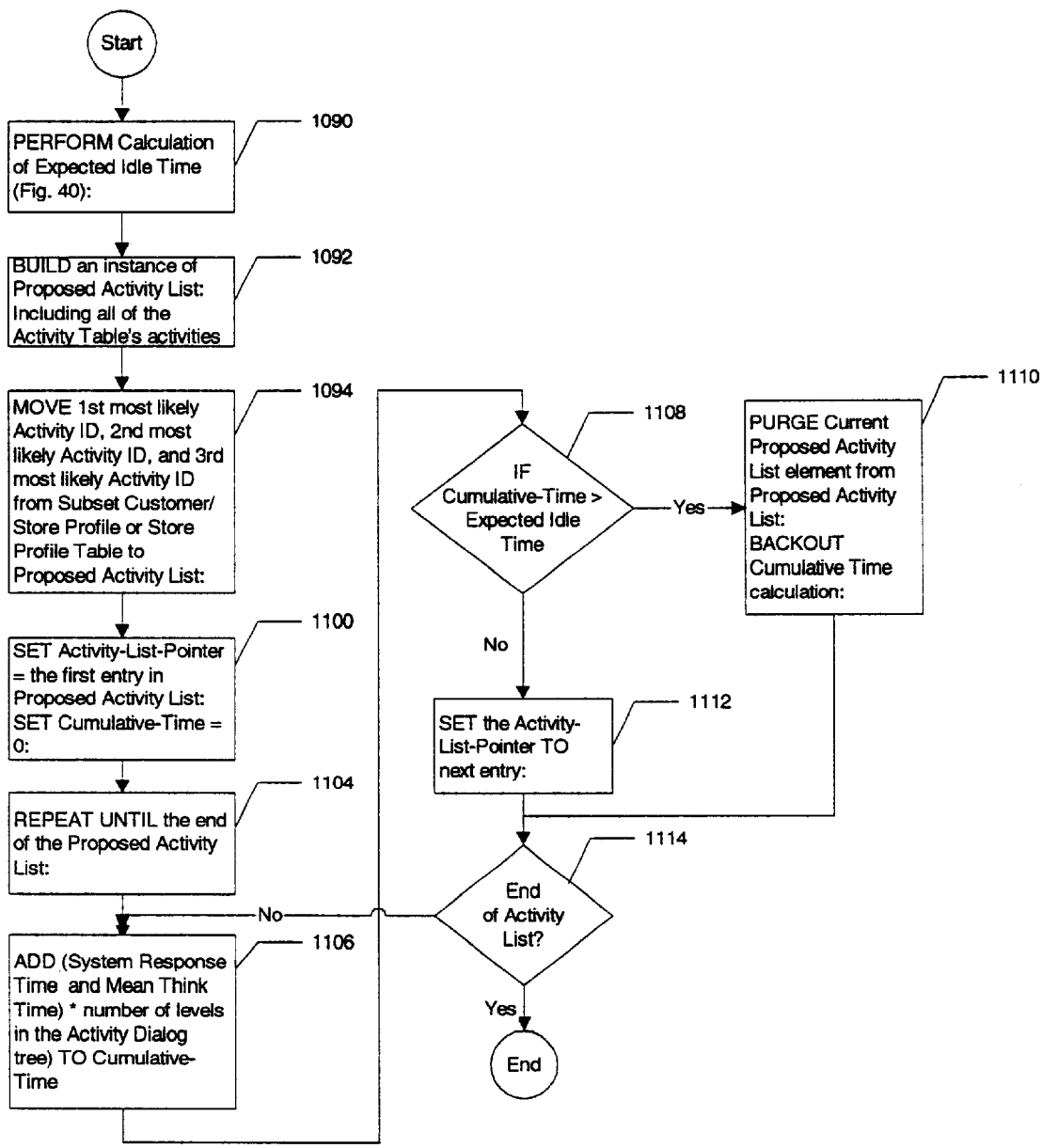
Fig. 42. Selection of Proposed Activities 1090

Fig. 44. Customer Session Table Generation 1120
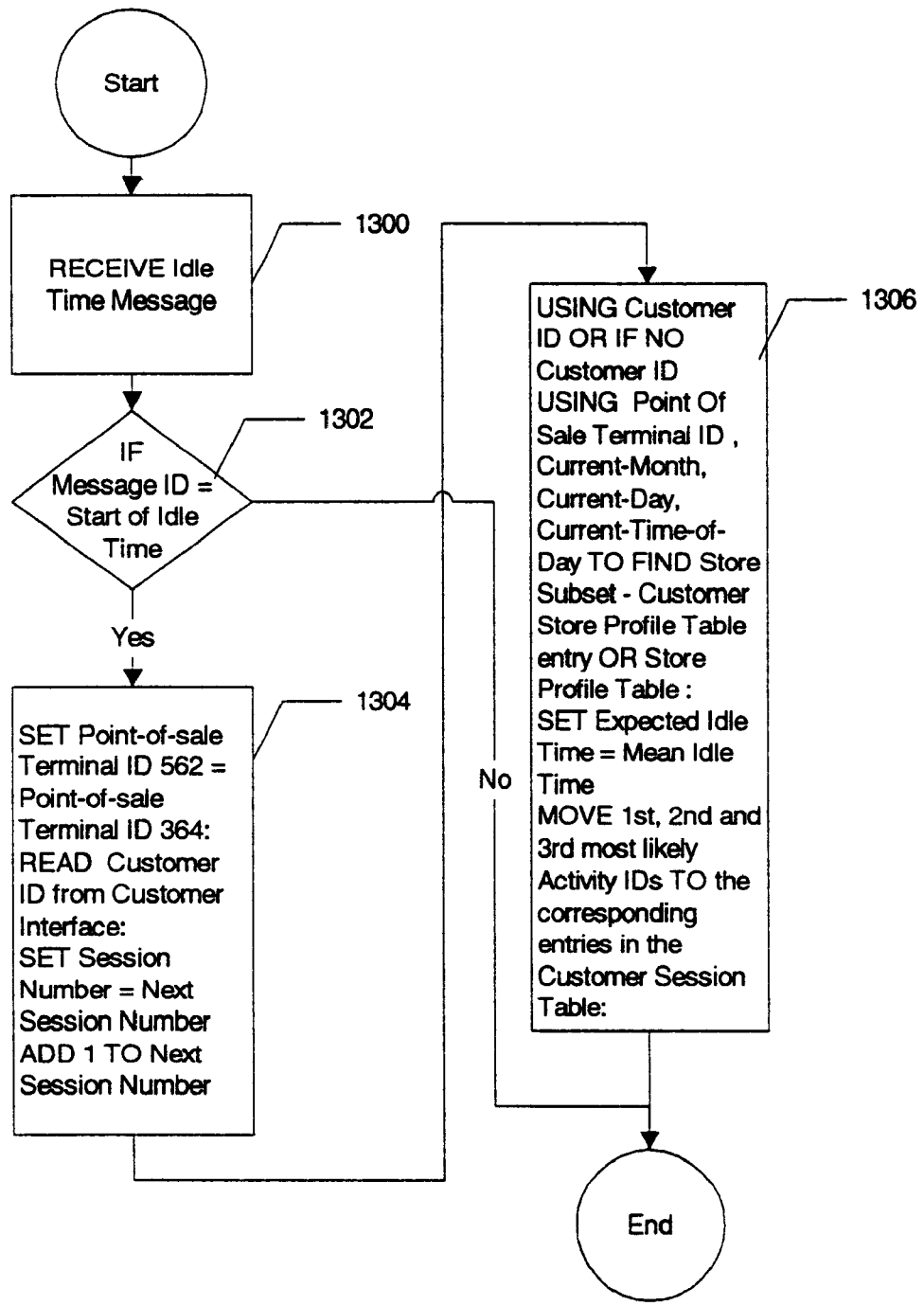

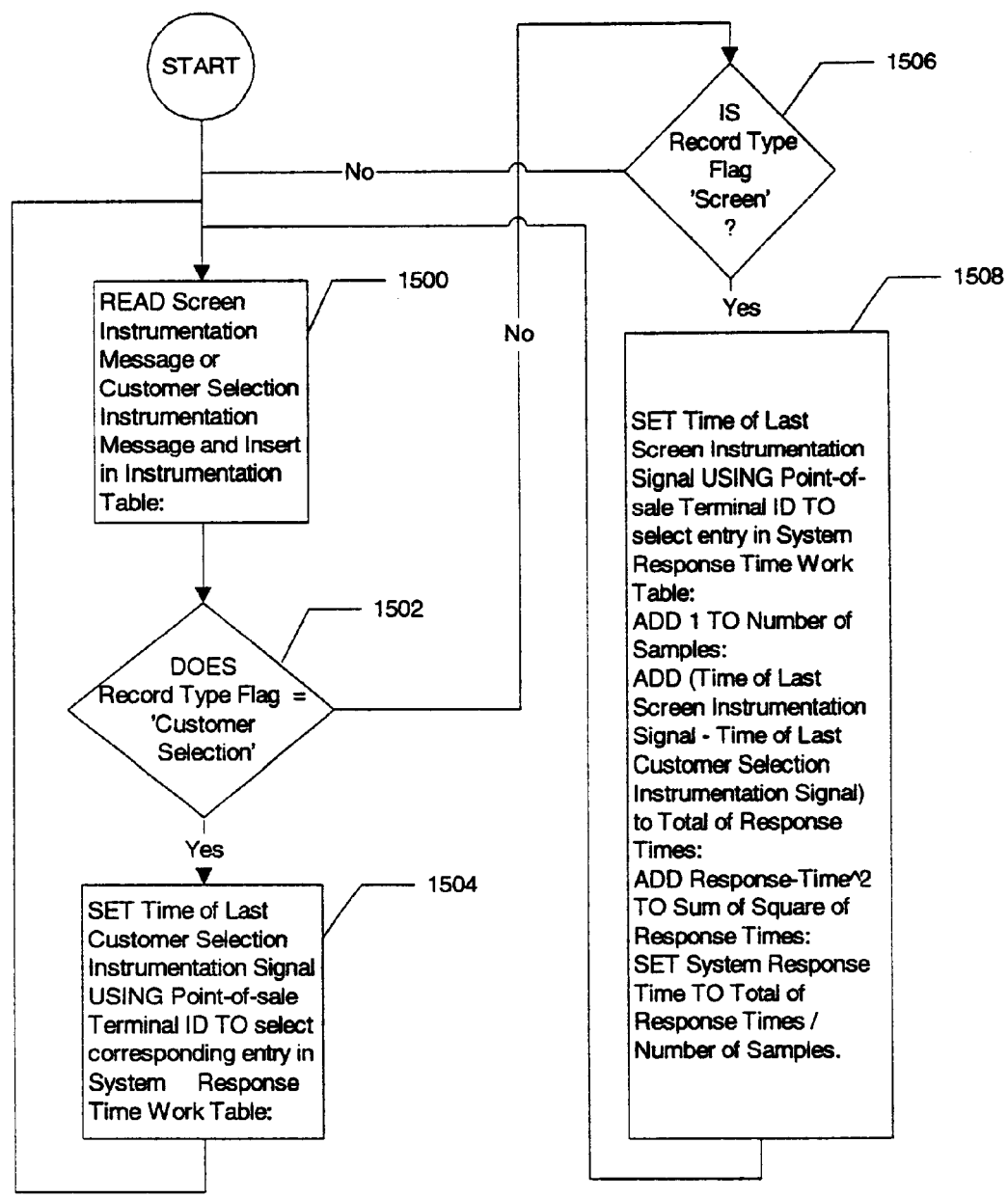
Fig. 46. System Response Time Calculation 1160

METHOD AND APPARATUS FOR USING PRIOR ACTIVITIES TO IMPROVE THE PROBABILITY OF COMPLETING TRANSACTIONS FOR A CUSTOMER IN A RETAIL ENVIRONMENT

FIELD OF THE INVENTION

This invention relates to a method of selecting a set of transactions, based on historical information, to present to a customer given: the customer's history, a store's history, and the time and day of the customers activity; such that the customers probability of completing the transaction is improved.

BACKGROUND OF THE INVENTION

This invention relates generally to point-of-sale computer systems of the type used in multilane retail stores, gas stations and banks to record transactions. Specifically, the invention relates to point-of-sale systems that can handle the presentation of visual or audio information to the customer and allow that customer to respond to that information. Point-of-sale systems have mechanisms for inputting a code recorded on a credit card, debit card, loyalty card, drivers license, and/or acquiring via some other means the identification of a customer being serviced. Such mechanisms include magnetic track readers (commonly called 'stripe readers'), key pads, and touch screens.

During-the final minutes of a purchase of products in a retail environment, the customer is faced with a period of idle time. In a multilane store (grocery, variety goods . . . ) the customer waits for the checkout clerk to ring up the various purchases. In a gas station, the customer waits for the attendant or pump to fill the tank. This is wasted time. In general, neither the customer nor the store benefits from the activities of the customer during this time.

A mechanism for making use of this time can allow the retailer to gain additional revenue and profit. This invention allows these objectives to be met by providing the selection of transactions that the customer can perform during this time such that the transactions are likely to be ones the customer would select.

SUMMARY OF THE INVENTION

The method of the invention involves the collecting of information about the characteristics of the customer, including their interactions with this system, in a specific venue, at a time of day, and date; building profiles regarding specific customers and generic customers; collecting information about a current retail transaction, and using that information in whole or in part to optimize the customer idle time. An optimization takes into effect the value of a proposed use of idle time to the presenting retailer, the utility to the customer, and the customers previous reactions to similar transactions offered by this system.

A number of means are provided to: identify the customer; identify the venue; identify a start of idle time; present information; measure the time taken to present information; measure the time taken by the customer to respond to information; log frames (screen or audio) presented to the customer; log the frame choice made by the customer; relate the frame choice to a specific ad, coupon, product offering, or service offering; to estimate customer idle time; to construct dialogs leading to specific ads, coupons, product offerings and service offerings; to fit alternative dialogs to the idle time; evaluate the alternative dialogs; and to select between the alternative dialogs.

The invention performs the steps of collecting information from customer transactions at specific store locations; aggregating that information at a computer; analyzing the aggregated information to: extract the probability of habitual activities, determining a likely speed of the customers response to various presentations, determining repeated sequences of actions that can be combined into a fewer number of actions; collecting the value of all the possible transactions; and using this information to estimate the time the customer will be idle at the point-of-sale terminal; and selecting the best set and ordering of transactions that will fit within the expected idle time while maximizing the probability of completing the transaction(s).

BRIEF DESCRIPTION OF THE DRAWINGS

FIG. 12. Is a data table that describes the Customer.

FIG. 13. Is a data table that describes a Customer/Store Profile.

FIG. 14. Is a data table that describes a Store Subset of the Customer/Store Profile.

FIG. 15. Is a data table that describes Credit, Debit, and Loyalty Cards.

FIG. 16. Is a data table that describes a Store Definition Table.

FIG. 17. Is a data table that describes a Customer Session.

FIG. 18. Is a data table that describes a Screen Instrumentation Message.

FIG. 19. Is a data table that describes a Customer Selection Instrumentation Message.

FIG. 20. Is a data table that describes an Instrumentation Table.

FIG. 21. Is a Customer Profile Generation Instrumentation Table.

FIG. 22. Is a Point-of-Sale Terminal Table.

FIG. 23. Is a data table that describes a Store Profile Table.

FIG. 24. Is a data table that describes a Customer Session.

FIG. 25. Is a data table use for Time of day Conversion.

FIG. 26. Is a list of proposed Activities.

FIG. 27. Is the Activity Table.

FIG. 28. Is a Screen Definition Table.

FIG. 29. Is a Text Element Table.

FIG. 30. Is a Graphic Element Table.

FIG. 31. Is a Touch Element Table.

FIG. 32. Is a Key Pad Element Table.

FIG. 33. Is an Activity Work Table.

FIG. 34. Is a Store Configuration Table.

FIG. 35. Is a System Response Time Work Table.

FIG. 36. Is an activity diagram that describes a Customer Session in a Grocery Store.

FIG. 37. Is an activity diagram that describes usage of Customer Idle Time.

FIG. 38. Is an activity diagram that describes a Customer Activity Cycle.

FIG. 39. Is an activity diagram that describes Customer Action Cycle.

FIG. 40. Is a flow chart for Detecting Start and End of Idle Time;

FIG. 41. Is a flow chart describing the Calculation of Expected Idle Time.

FIG. 42. Is a flow chart describing the Selection of Proposed Activities.

FIG. 44. Is a flowchart describing the Customer Session Table Generation.

FIG. 46. Is a flow chart describing the System Response Time Calculation.

DETAILED DESCRIPTION OF THE INVENTION

The invention is described in terms of a multilane store (that is, a store with multiple checkout counters), but applies to other retail, wholesale, and financial institutions.

Figure 1:
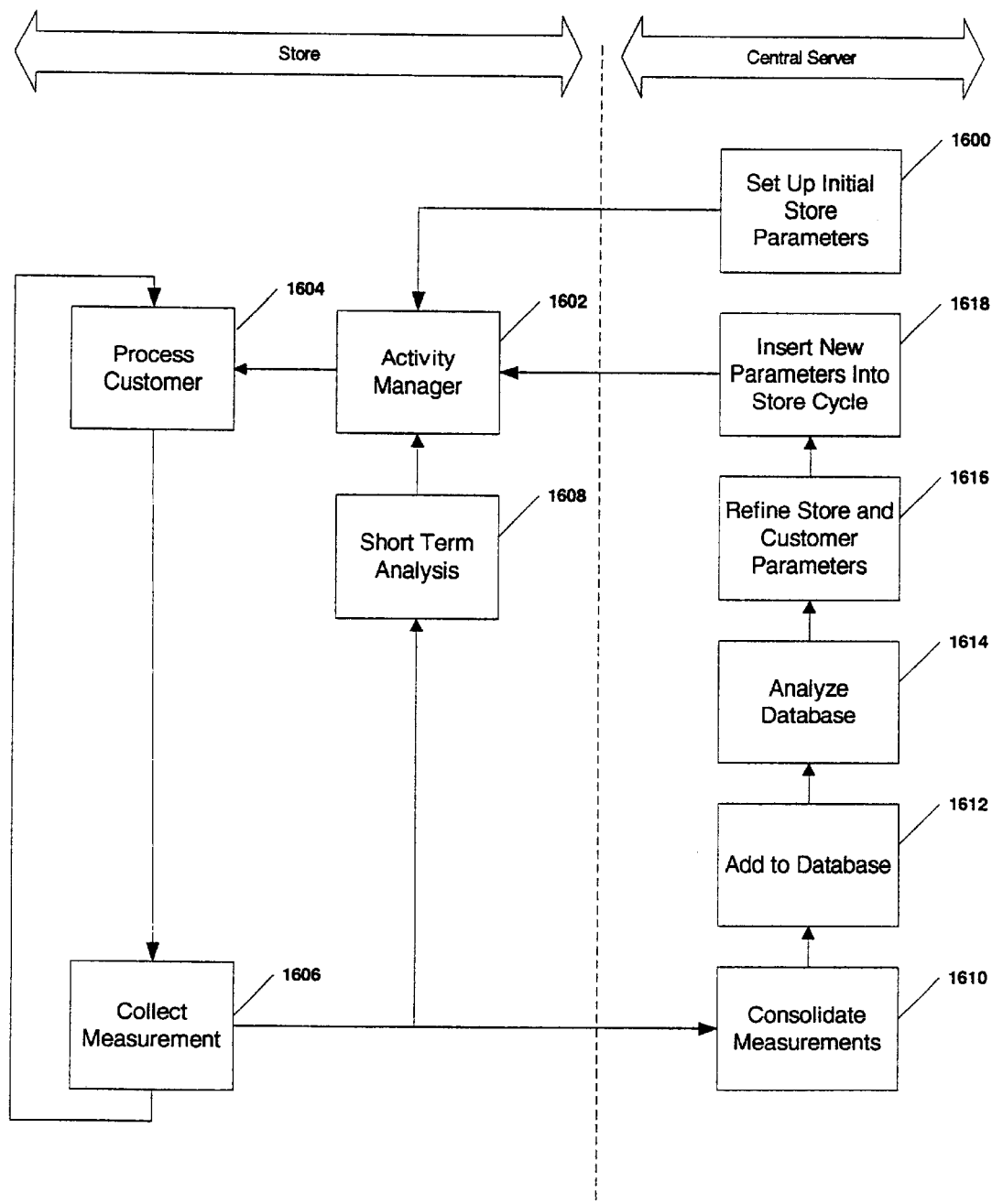
FIG. 1. Is a diagram of the flow of information in the system implementing the invention.

FIG. 1. Describes the flow of information in the system. In a store there is a established process for collecting payment from a customer. This is represented in Process Customer 1604. Prior to the installation of an implementation of this invention the process deals with 'ringing up' the prices of the items purchased, establishing the total price, and collecting that total from the customer; then repeating the process with subsequent customers. This process is modified to present information to the customer during the times in the Process Customer 1604 that the customer is idle (normally this is while the purchases are being 'rung up'). To affect this, step 1604 is modified as shown subsequently, and steps 1600, 1602, and 1603 through 1618 are added to the system.

Once the store has been set up, Set Up Initial Store Parameters 1600 communicates to the Activity Manager 1602 a set of default parameters including Store Profile Table 510, Screen Definition Table 800, Text. Element Table 820, Graphic Element Table 840, Touch Element 860 Table, Key Pad. Element Table 880, Store Configuration Table 910, Activity Dialogs 200, Store Subset—Customer-Store Profile Table 290, and Activity Table 600. Process Customer 1604, prompts Activity Manager 1602 with a Customer ID supplied by the Customer Interface 22. The Activity Manager 1602, using the available data constructs Proposed Activity List 590, as describe in FIG. 42. Selection of Proposed Activities 1090, and transforms those activities into a Customer Idle Time Dialog 180 by using the Expected Idle Time 570 which is described in FIG. 41. Calculation of Expected Idle Time 1080. This is passed to FIG. 42. Selection of Proposed Activities 1090, which generates Proposed Activity List 590 with an excess of activities which are then pruned to fit Expected Idle Time 570 within the Percent On Time Completion 554 criteria. Then Activity Manager 1602 generates Customer Idle Time Dialog 180 from Proposed. Activity List 590.

Process Customer 1604 uses the Customer Idle Time Dialog 180 to control the presentation of various Screens 210 to the customer.

As screens are presented and responded to, Screen Instrumentation Messages 370 and Customer Selection Instrumentation Messages 390 are generated. These are transmitted to Collect Messages 1606 for transmission to Short Term Analysis 1608 and Consolidate Measurements 1610. Short Term Analysis 1608 uses the information to update Store Configuration Table 910. This information is used to refine the ability of the Activity Manager 1602 to estimate System Response Time 916 and Std. Deviation of System Response Time 918. Consolidate Measurements 1610, pools the information for a period of time (say a month) adding it to a database of measurements (Add to data base 1612), then Analyze Database 1614 is triggered to determine which profiles should be updated and then passes control to Refine Store and Customer Parameters 1616 which generates a new set of parameters for Store Profile Table, and Store Subset—Customer Store Profile Table 290. Inserts New Parameters into Store Cycle 1618, which takes that information and inserts it into the appropriate store's Activity Manager 1602, completing the cycle.

Figure 2:
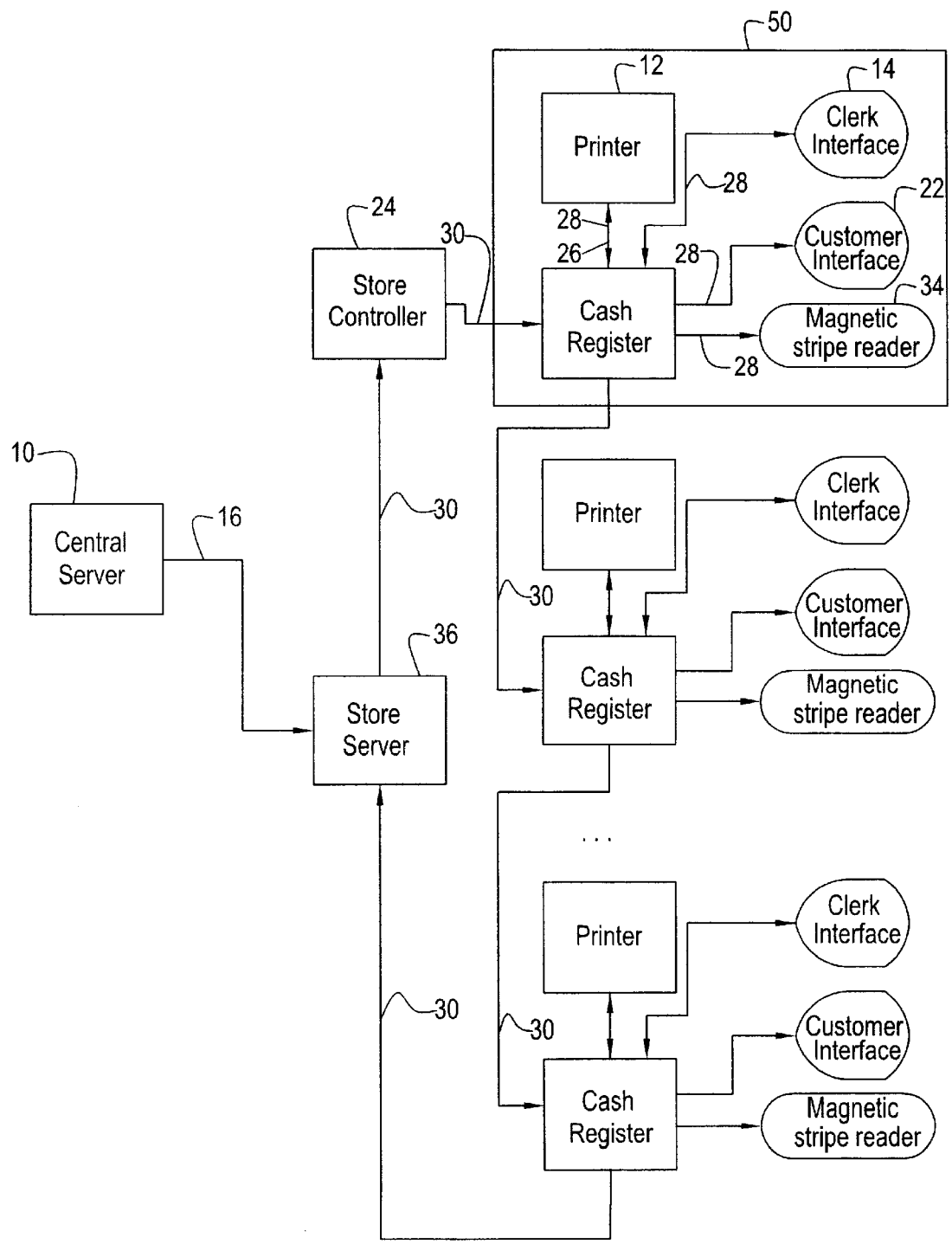
FIG. 2. Is a diagram of a computer system, which is adapted to perform the method of the invention.
Figure 6:
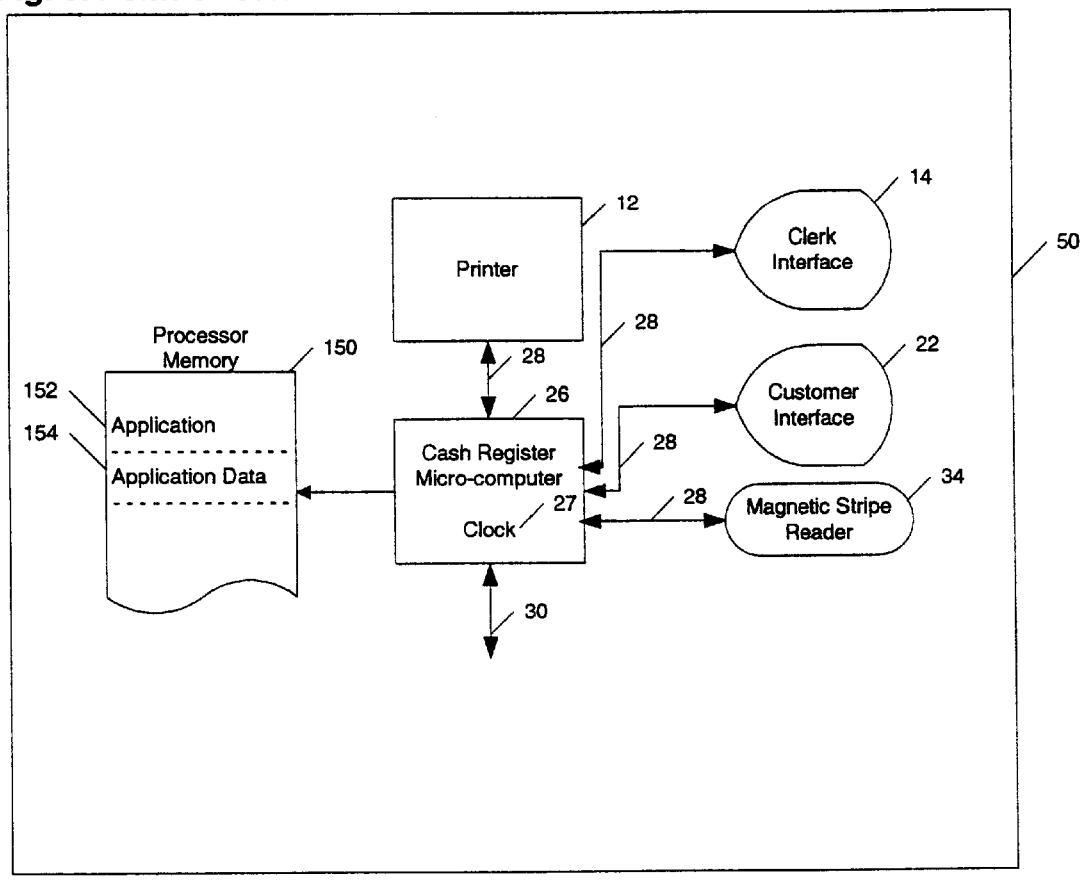
FIG. 6. Is a diagram of a computer system representative of a Point-of-Sale Terminal.

FIG. 2 is a diagram of a network of computers adapted to perform the method of the invention. A Central Server 10 is coupled by a wide area network (WAN) 16 to one or more Store Servers 36. Readily available software and protocols such as TCP/IP are used by Central Server 10 and Store Server 36 to communicate with each other via WAN 16. Store Controller 24 and Store Server 36 are connected via LAN 30 to one or more Point-of-Sale Terminals 50. Normal Point-of-Sale Terminal activities are conducted between the Store Controller 24 and Point-of-Sale Terminal 50 (FIG. 6). The numeral 28 represents conventional serial interfaces between the interconnected components. These activities are well documented elsewhere and the details are not important to this invention. The numeral 28 represents conventional serial interfaces between the interconnected components.

Figure 3:
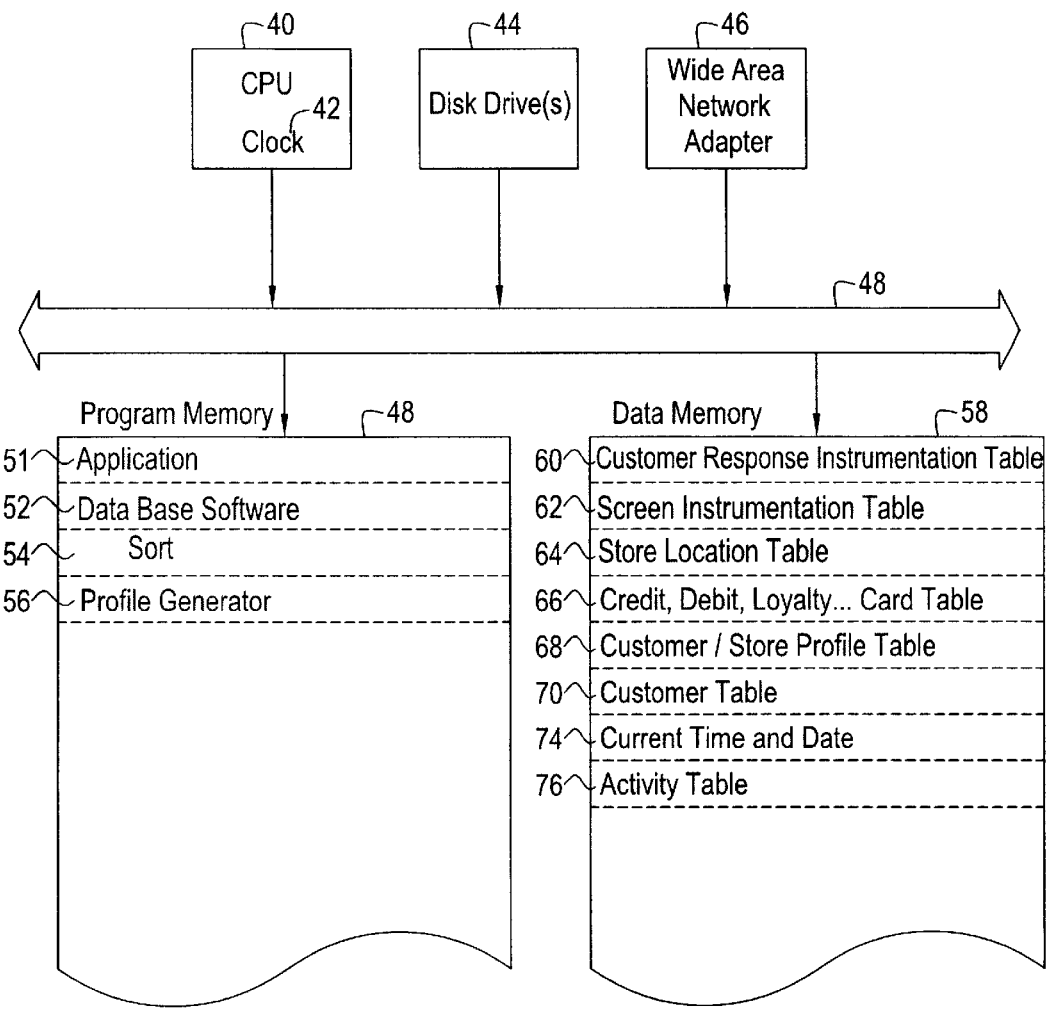
FIG. 3. Is a diagram of a computer system called the Central Server.

FIG. 3. Illustrates further details of Central Server 10. Central Server 10 performs the functions of collecting customer data and store data, analyzing the data to extract information concerning buying habits and thinking characteristics of the customer, and information about the performance characteristics of the store. CPU 40 is a conventional microprocessor with a Bus 48 that connects it to Disk Drive(s) 44, a WAN Adapter 46, a Program Memory 48 and a Data Memory 58. CPU 40 contains a Clock 42 that provides time in a form that includes the Month, Day-of-week, Hour, Minute, And Seconds. Program Memory 48 contains Application 51 that performs the following functions. It collects information stored in Store Server 36 via WAN 16 using standard communication protocols such as TCP/IP. The information collected is in the form of the following tables: Credit, Debit, Loyalty . . . Card Table 330, Store Definition Table 340, Screen Instrumentation Table 62, Customer Selection Instrumentation Table 60, and Activity Table 600. This information is stored using Database Software 52 into Data Memory 48 and subsequently onto Disk Drive(s) 44. A generalized Sort 54 is used by Profile Generator 56 to order the data as described in FIGS. 43A, 45A and 45C.

Periodically a Profile Generator 56 analyzes the data to produce the: Customer/Store Profile Table 68, and Store Profile Table 510, See FIGS. 43A and 43B description below for how this is accomplished. Customer/Store Profile Table 68 and Store Profile Table 144 are sent to the Store Server 36 specified in the Store ID 246, and Store ID 512 of the respective table. Additionally Data Memory 58 contains the Current Time and Date 74 provided from the Time-of-day clock in CPU 40.

A Customer Table 70 contains basic information about a customer and is used as linkage between the various forms of customer identification and the Customer Store Profile 68. Current Time and Date 74 is used to provide the time stamps necessary to build Screen Instrumentation Table 62. Activity Table 76 provides the characteristics of the various Activate Dialogs 200 that are available to be selected to be sent to the various stores defined in Store Location Table 64.

Figure 4:
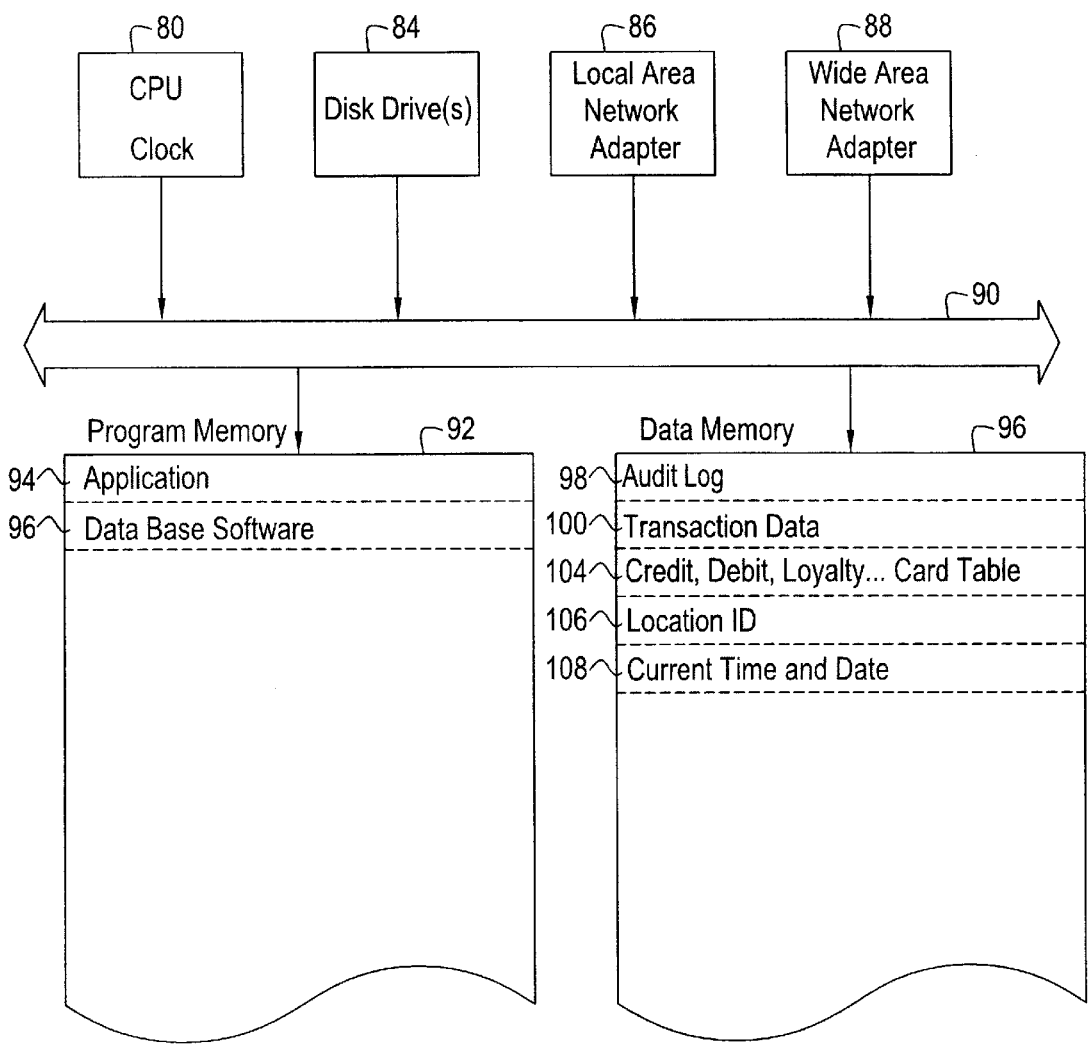
FIG. 4. Is a diagram of a computer system called the Store Controller.

FIG. 4. Store Controller, is a representation of a typical Store Controller 24. Store Controller 24 performs the functions required in a Point-of-Sale system that are in support of Point-of-Sale Terminals 50 in a location. CPU 80 is a conventional microprocessor with a Bus 90 that connects it to Disk Drive(s) 84, a LAN Adapter 86, a WAN Adapter 88, a Program Memory. 92 and a Data Memory 96. CPU 80 contains a Clock 82 that provides time in a form that includes the Month, Day-of-week, Hour, Minute, And Seconds. This system typically contains an Audit Log 98, a Price Table 102, a Credit, Debit, Loyalty . . . Card Table 104 and a Location ID 106. In addition Application 94 collects Transaction Data 100 that identifies the customer and the details of the purchase. Application 94 stores the data described in Data Memory 96 on Disk Drive(s) 84 using commercially available Database Software 97.

The key function provided by the Store Controller 24 that are used by this invention are signals from Application 94 to Store Server 36 concerning the start and completion of Check Out Idle Time 1010. These signals comprise the sending of an Idle Time Message 360 containing a Message ID 362 of 'Start of Idle Time' or 'End of Idle Time' as appropriate. Point-of-Sale Terminal ID 364 is also included so as to be able to associate the signal with an existing entry in the FIG. 24 Customer Session Table or to create a new entry in the FIG. 24.

Customer Session Table. These items are forwarded to the FIG. 5 Store Server at the beginning or end of the customer session.

Data Memory 96 contains Current Time and Date 108 provided from Clock 82 in CPU 80. This is used to time stamp the various communications with FIG. 24 Store Server.

The rest of the function of FIG. 4 Store Controller is not a part of this invention.

Figure 5:
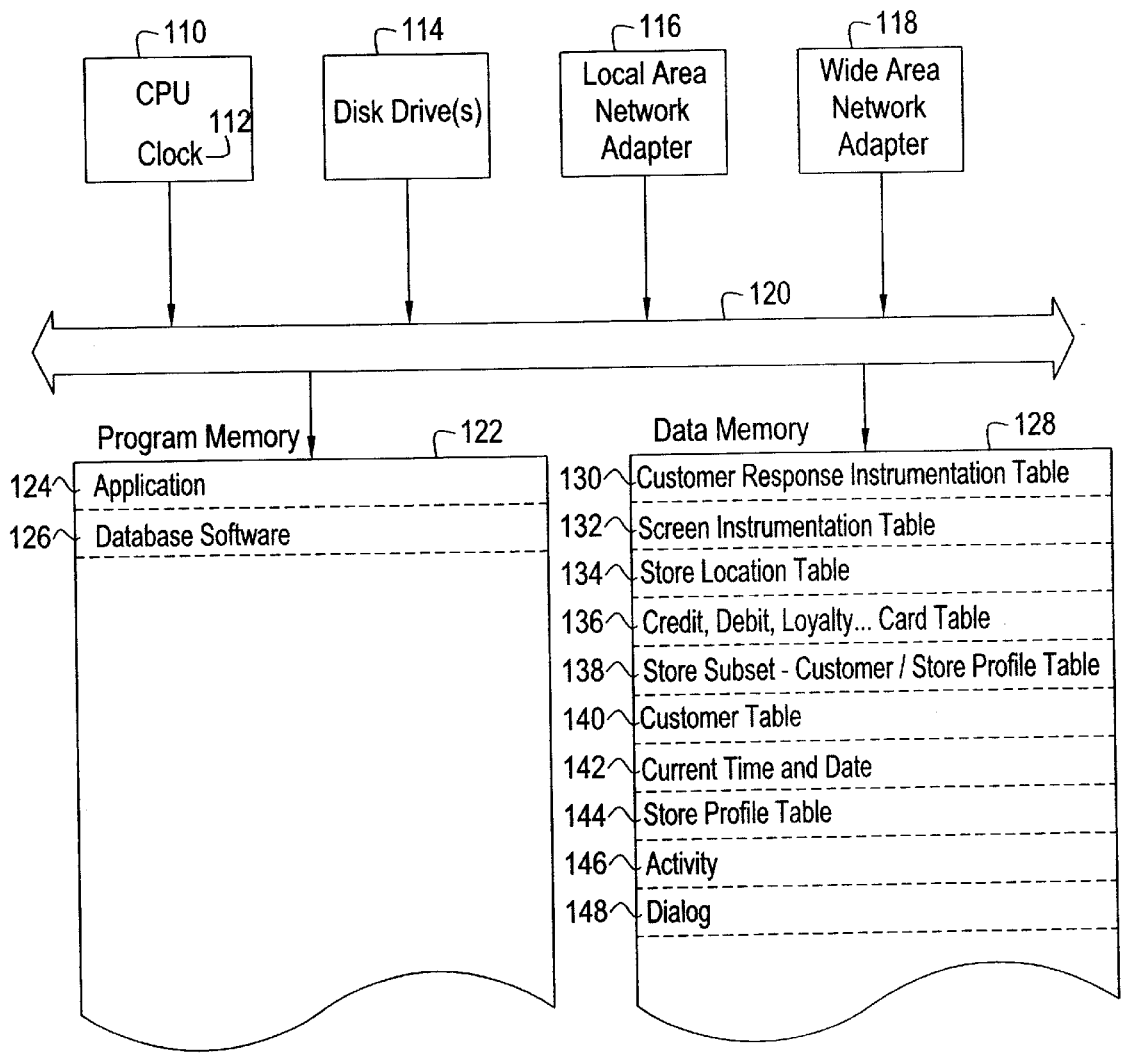
FIG. 5. Is a diagram of a computer system called the Store Server.

FIG. 5. Store Server is a representation of a Store Server 36. Store Server 36 is described as though it is implemented as a separate computer system; however, the function provided can be performed in Store Controller 24 or other computer systems in the store. Store Server 36 communicates with Central Server 10 via WAN Adapter 118 to acquire the information and store it in Data Memory 128 and on Disk Drive(s) 114. Internally the various components communicate via Bus 120. The tables acquired are: Store Location Table 134, Store Subset—Customer/Store Profile Table 138 (FIG. 14), Credit, Debit, Loyalty . . . Card Table 136 (FIG. 15), Customer Table 140 (FIG. 12), Store Profile Table 510 (FIG. 23), and Activities 200 (FIG. 5). Response Instrumentation Table 130 (FIG. 20), Screen Instrumentation Table 132 composed of FIG. 18 Screen Instrumentation Messages, and Dialog 148 (FIG. 8) are initialized or generated by Store Server 36 using Application 124 which is stored in Program Memory 122. Dialog 148 is constructed from Activities 200 as described in FIG. 42. Application 124 accesses and stores these data items on Disk Drives 114, making use of commercially available Data Base Software 126 to provide storage selection and retrieval functions that it needs.

FIG. 6. is a diagram of a point-of-sale terminal. Current Point-of-sale Terminals 50 are configured using a Cash Register Micro-computer 26 of conventional design. The Cash Register Micro-computer 26 contains a Clock 27 that provides time in a form that includes the Month, Day-of-week, Hour, Minute, And Seconds. Attached to the Cash Register Micro-computer are various input and output devices including: a LAN 30, Printer 12, Clerk Interface 14, Customer Interface 22, and Magnetic Stripe Reader 34. These are attached via electronic links 28 which normally are serial IO like an RS232 serial port. Customer Interface 22 is used for presenting the actions to the customer and receiving the responses. Magnetic Stripe Reader 34 is often the source of the first customer response. Cash Register Microcomputer 26 sends Screens 210 from Customer Dialog 80 to Customer Interface 22 on behalf of Store Server 36 Application 124. It also returns a Selection 64 . . . picked in response to these action alternatives, to Store Server 36 via LAN 30.

Processor Memory 150 contains Application 152 and Application Data 154 needed to run Point-of-Sale Terminal 50.

Figure 7:
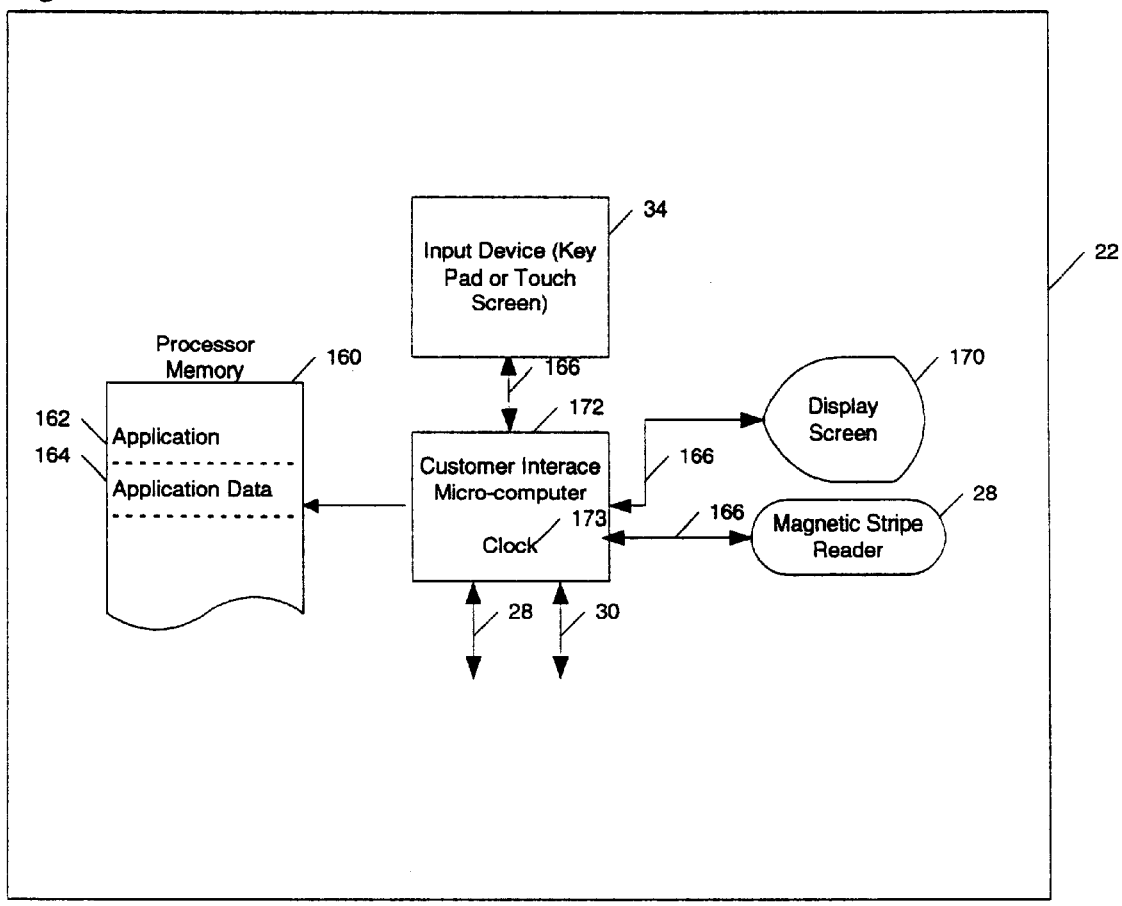
FIG. 7. Is a diagram of a Customer Interface.

FIG. 7. Is a diagram of Customer Interface 22. Customer Interface 22 has a Customer Interface Microcomputer 172 that is attached via a LAN 30 and/or Serial Interface 28 to Store Controller 24 and Store Server 36 (optionally), and is attached to Store Server 36 via LAN 30. Customer Interface Microcomputer 172 contains a Clock 173 that provides time in a form that includes the Month, Day-of-week., Hour, Minute, And Seconds. Customer Interface 22 has a Display Screen 170, which can display textual and (optionally) graphical information to the customer. Magnetic Stripe Reader 29 is provided to allow the input of customer identification information from a variety of identification cards. Input Device 34 is used to allow the customer to manually input information. Input Device 34 is typically a keypad or touch screen. As Customer Interface Microcomputer 172 is programmable, it is capable of performing the various functions described elsewhere. The elements of Customer Interface 22 are connected by a Local Bus 166. As implementations vary from manufacturer to manufacturer, more than one Local Bus 166 may be used. Processor Memory 160 contains Application 162 and Application Data 164 need to run the Customer Interface.

Figure 8:
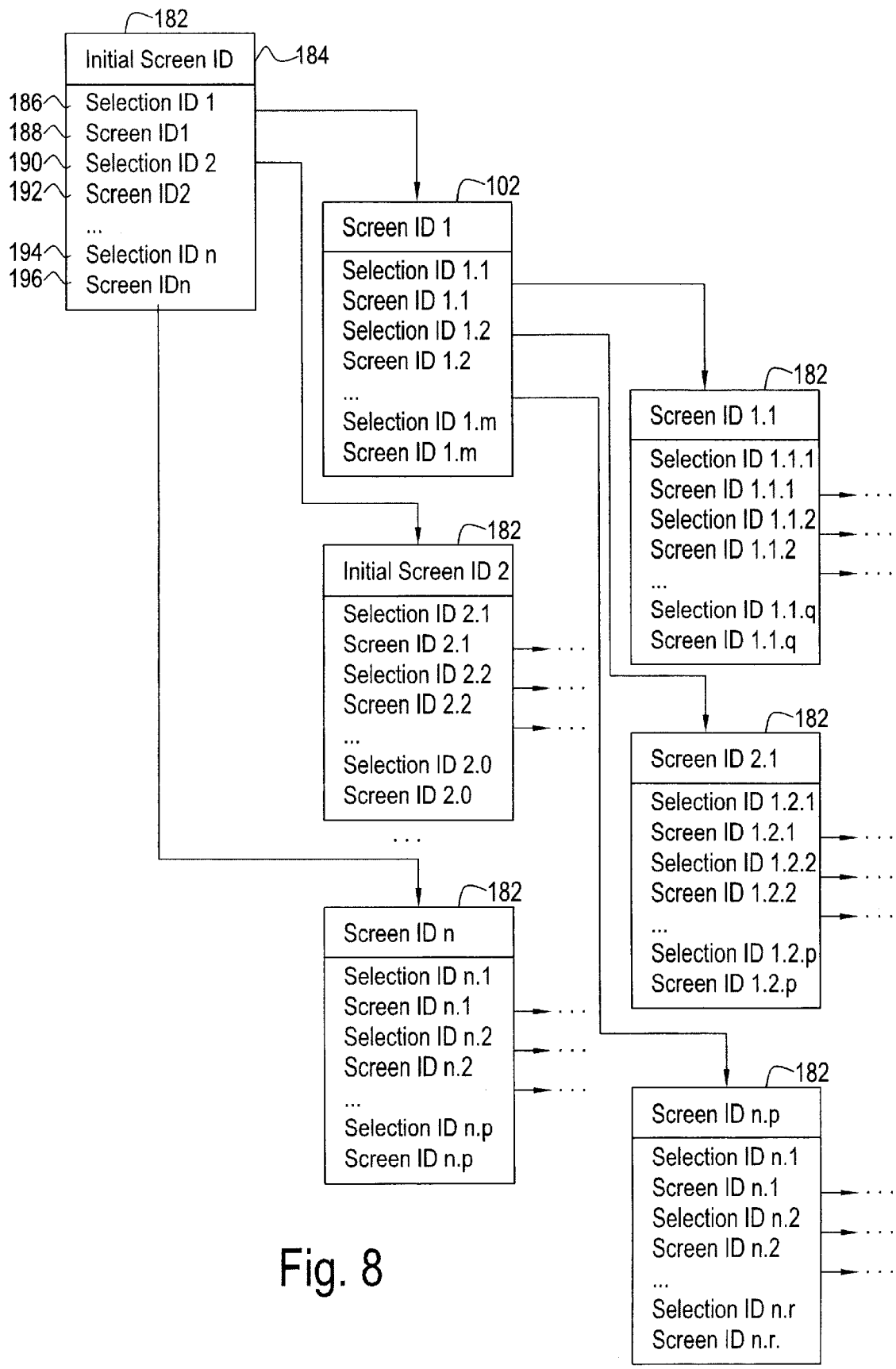
FIG. 8. Is a diagram of a tree structure that represents a Customer Dialog.

FIG. 8. is a diagram of a structure that represents a Customer Dialog 180. Customer Dialog 180 is composed of a number of screen presentations. The presentations start with a screen called Initial Screen 62, which is a Screen as defined in the FIG. 28. Screen Definition Table. Initial Screen ID 184 is a Screen ID for a screen stored in the FIG. 28. Screen Definition Table. Associated with Initial Screen ID 184 is a list of Screen ID's 188, 192 and 196 that are individually associated with a Selection ID 186, 190, and 194. The selections are activated by Touch Element 860 or Key Pad Element 860 specified by the various Selection IDs. Customer Dialog Block 182 is a table with a list-of the allowable Selection ID's 186, 190, and 194 and Screen ID 188, 192 and 196, of the screen that is to be displayed if that selection is made. Customer Dialog Blocks 182 are chained together using the various Screen IDs. As the Screen ID is used for the linkage, any meshed structure of Customer Dialog Blocks is possible.

Figure 9:
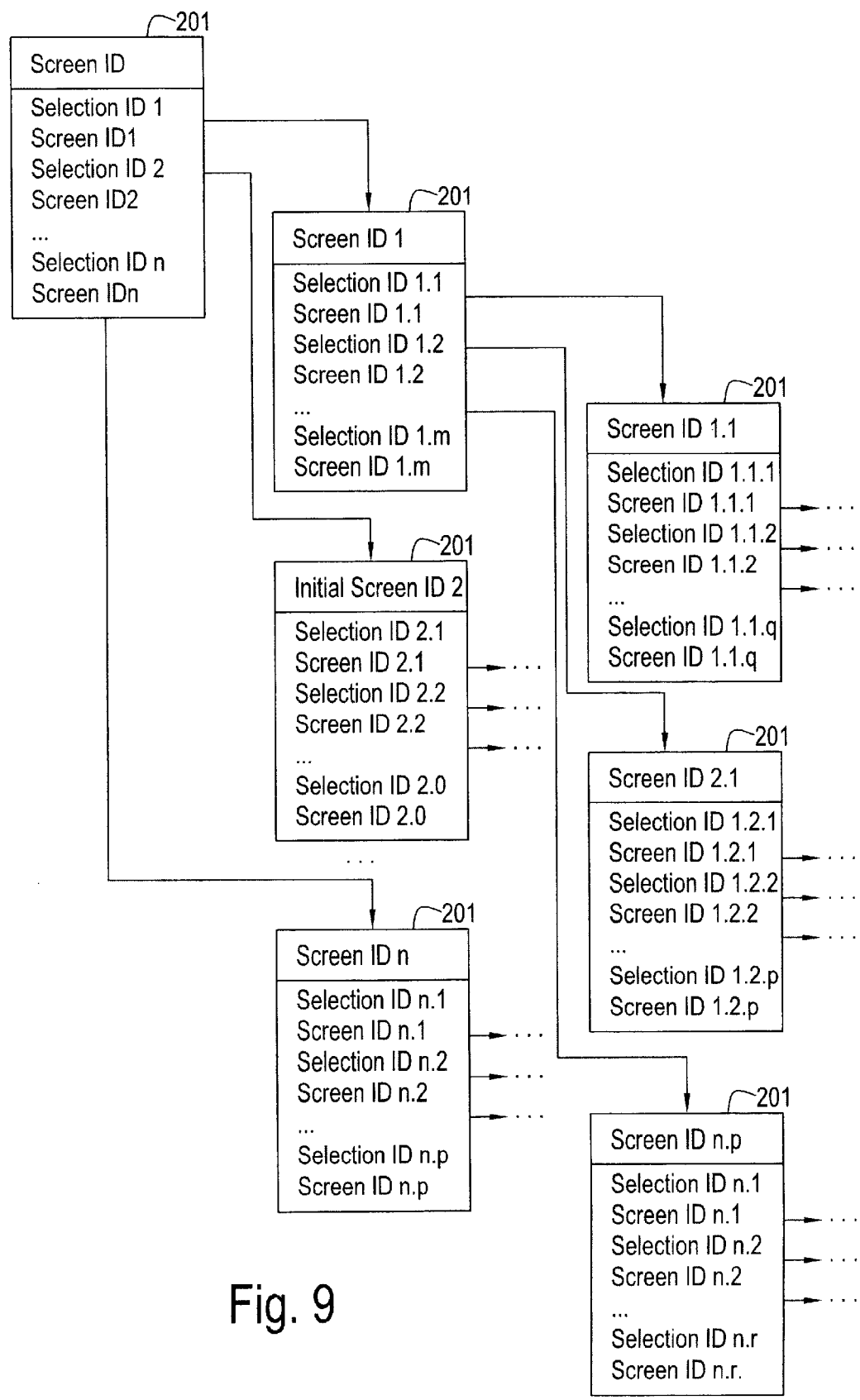
FIG. 9. Is a diagram of a tree structure that represents a Customer Activity.

FIG. 9. is a diagram of a structure that represents a customer Activity. An Activity 200 is a sub-set of a Customer Dialog 180. It is composed of Customer Dialog Blocks 201. An Activity 200 may result in the viewing of an advertisement, the issuance of a coupon, the sale of a product or service . . . through the presentation of a number of screens, as directed by the selections made by the customer as the screens are presented. Customer Dialog Blocks 201 are navigated as in the description in FIG. 8. Activity's Screen ID 202 fills the same function as Initial Screen ID 184 for Activity 200. It is the anchor point for the various screens required to accomplish an activity.

Figure 10:
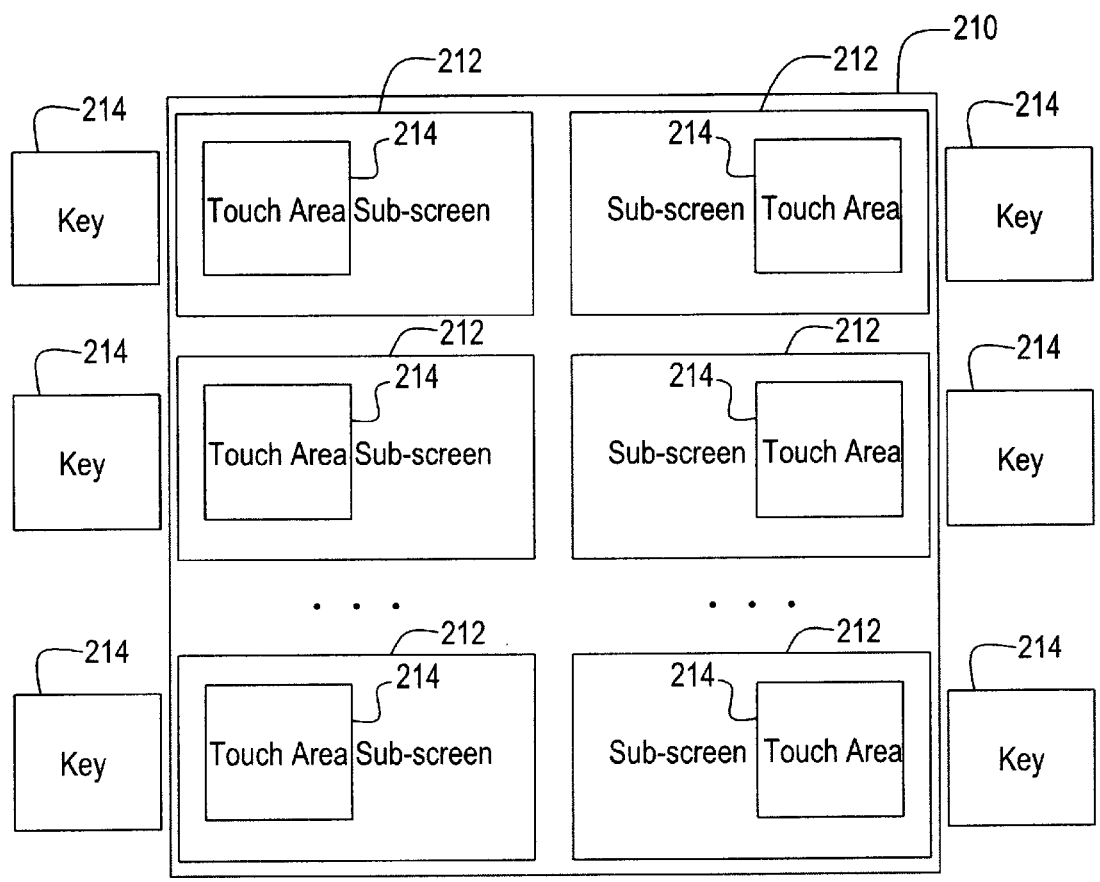
FIG. 10. Is a diagram of the Screen and its associated input areas.

FIG. 10. is a diagram showing the elements of a Screen 210 and associated Manual Input Areas 214. In this embodiment, Screen 210 is composed of one or more Sub-screens 42. Each Sub-screen 212 contains graphical and/or text elements that occupies an area of Screen 210. These Sub-screens may be associated with a key on a keypad or a touch area on Screen 210. These are called Manual Input Areas 214. Screen 210 has a Screen ID 384. The definition of a Screen 210 can be found in the FIG. 28 Screen Definition Table.

Figure 11:
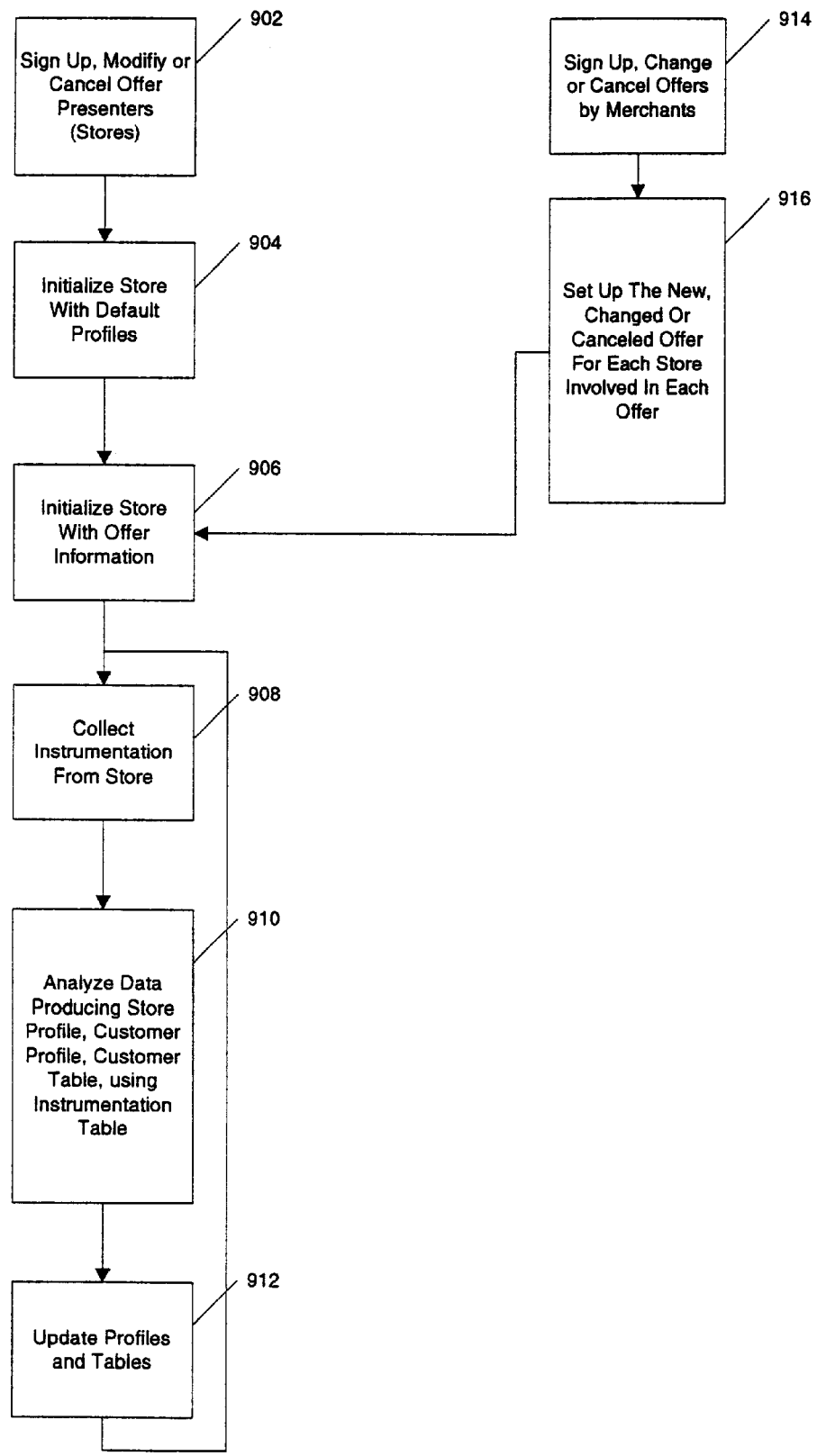
FIG. 11. Is a diagram that shows Store Setup and Update process.

FIG. 11. Is a diagram showing Store Setup and Update process. There are two independent sources that start the process. Step 902 describes the sign up, modification or cancellation of a retail entity concerning its stores' participation in presenting offers to customers, and the collection of various data, as is found in the FIG. 16. Store Definition Table. This information is communicated from Central Server 10 to Store Server 36 via WAN 16 and is stored in Store Server 36 Data Memory 128 and subsequently to a Disk Drive 114 as in step 904.

Independently, as in step 914, merchants sign up to make, modify, or cancel offers through the various stores participating in the overall system. Step 916 shows the collection of various data that describes the sales campaign they wish to conduct. These activities result in building, for each store Involved In each offer, the various Screens 210, Activities 200, Screen Definition Table 800 entries, Text Element Table 820 entries, Graphic Element Table 840 entries, Touch Element Table 860 entries, and Keypad Element Table 880 entries. These are sent to Store Server 36 in the stores involved with the offer (Step 906).

In Step 908 the Store Server 36 activates the instrumentation in Customer Interface 22, which begins sending Screen Instrumentation Messages 370 and Customer Selection Instrumentation Messages 390 to Store Server 36. These are accumulated in Instrumentation Table 510. When that table is filled to a preset level, the contents of Instrumentation Table 510 are sent to Central Server 10, where it is added to instrumentation Table 510 at Central Server 10. Store Server 36 Instrumentation Table 510 is then reset to empty awaiting more entries.

In Step 910, an analysis process is started periodically in Central Server 10, using Current Instrumentation Table 510, Customer Store Profile Table 240. Store Profile Table 510, Store Definition Table 340, Customer Table 220, and Credit, Debit, Loyalty . . . Card Table 330 to construct updated Customer Store Profile Tables 240, Store Subset Customer Store Profile Table 190, and Store Profile Tables 510, as described in the FIGS. 43A and 43B Store Profile Table Generation and FIGS. 45A, 45B and 45C Customer Store Profile Table Generation.

In Step 912 these updated Store Subset—Customer Store Profile Tables 290 and Store Profile Tables 510, are sent back to the Store IDs as specified in Store IDs 294 and 512.

This process continues by repeating Steps 908, 919 and 912.

DATA TABLE FORMATS

FIG. 12. illustrates Customer Table 220 that contains a Customer ID 222 which is the ID provided to the retailer by the customer in the course of the primary transaction being performed. It may be a credit card number or other ID, or no ID (anonymous ID). It also contains Customer Name 226, Address 228, Date of Creation 230, and Data of Profile Update 232.

FIG. 13. is a data table that describes a FIG. 13. Customer/Store Profile Table 240. This profile contains the information about the customer's time consumption habits in various circumstances. Customer ID 242 identifies a unique customer. Store ID 246 identifies the store the FIG. 13. Customer/Store Profile Table 240 applies to. The Date of Last Update 248 is a control field that is used to trigger periodic updates of the FIG. 13. Customer/Store Profile Table 240. Date Created 250 is the date the first FIG. 13. Customer/Store Profile Table 240 was generated by the system. Mean Think Time 252 is the estimated think time for the customer in the specified store. The Std. Deviation of Think Time 254 is standard deviation of the think time samples collected at the time Customer/Store Profile Table 240 was last updated. Number of Think Time Samples 256 is used to eliminate the need to maintain a historical database of think time samples beyond the current sample period. To maintain this value, Mean Think Time 252 and Std. Deviation of Think Time 254 use their previous values and the current samples.

A number of statistics are maintained in the FIG. 13. Customer/Store Profile Table 240 concerning customer idle time. The fields are: Mean Idle Time 264, Std. Deviation of Idle Time 266, Number of Idle Time Samples 268, $1^{st}$ most likely Activity ID 270, $2^{nd}$ most likely Activity ID 272, and $3^{rd}$ most likely Activity ID 74. These values are repeated for morning, mid-day, and evening for each day of the week and each month, for a total of 252 repetitions. Mean Idle Time 264 and Std. Deviation of Idle Time 266 are computed from the information collected in Screen Instrumentation Table 300 and Customer Selection Instrumentation Table 320, using Number of Idle Time Samples 268 as described above for Number of Think Time Samples 256. The FIG. 13. Customer/Store Profile Table 240 is generated and stored at Central Server 10.

FIG. 14. Is the Store Subset—Customer/Store Profile 240, a subset of the Customer/Store Profile 290 that contains the information needed by Store Server 36. It is extracted from Customer/Store Profile 240 by copying customer ID 242 to Customer. ID 292, Store ID 246 to Store ID 294 Mean Think Time 252 to Mean Think Time 296, Std. Deviation of Think Time 254 to Std. Deviation of Think Time 298, Mean Idle Time 264 to Mean Idle Time 306, Std. Deviation of Idle Time 266 to Std. Deviation of Idle Time 308, $1^{st}$ most likely Activity 270 to $1^{st}$ most likely Activity ID 310, $2^{nd}$ most likely Activity ID 272 to $2^{nd}$ most likely Activity ID 312, and $3^{rd}$ most likely Activity ID 274 to $3^{rd}$ most likely Activity ID 314.

FIG. 15. is the Credit, Debit, Loyalty . . . Card Table 330. The table associates Card ID 332 with a Customer Name 334 and Customer ID 336 which is assigned by Central Server 10 when the customer is initially added to the system.

FIG. 16. Is the Store Definition Table 340. The table contains a Store ID 342 which uniquely identifies the store; Store Type 343 which is used, optionally, to build Customer Store Profile Tables 240 that span instances of the same Store Type 343 or to build Store Profile Tables that span instances of the same Store Type 343; a Store a Corporate ID 344 which uniquely identifies the company or franchiser associated with the store; and Franchisee ID 346 which is used when the store is a franchise and uniquely identifies the franchisee. Store Definition Table 344 is built by Central Server 10 as stores are entered into the system.

FIG. 17. Is the Idle Time Message 360. These signals are messages generated by Store Controller 24 when it detects the start or stop of idle time as described in FIG. 40. Message Type 361 contains a specific code that distinguishes Idle Time Messages 360 from other messages. Message ID 362 specifies whether the signal is a 'Start of Idle Time' or a 'End of Idle Time'. Point-of-Sale Terminal ID 364 associates that signal with a specific checkout counter. This is then associated to a specific customer via Customer Session Table's 560 Point-of-Sale terminal 562 field.

FIG. 18. Is a data structure that describes the Screen Instrumentation Message 370. The FIG. 18. Screen Instrumentation Message is generated by Customer Interface 22 when it presents a screen, as defined in the FIG. 28 Screen Definition Table, and is sent to Store Server 36 for forwarding to Central Server 10 where it is placed in a table with the same format. Message Type 372 is a constant and is generated by Application 152 in Point-of-Sale Terminal 50. Customer ID 374 is extracted from the FIG. 24 Customer Session Table, as are: Store ID 378, Point-of-Sale Terminal ID 380, and Session Number 382. Screen ID 384, and Size 386 are extracted from the current Customer Dialog block 61. Time Stamp 388 is generated from Customer Interface Micro-processors 908 internal clock.

FIG. 19. Is a data structure that describes Customer Selection Instrumentation Message 390. The FIG. 19 Customer Selection Instrumentation Message is generated by Customer Interface 22 when it detects a touch or key press as defined in the FIG. 28 Screen Definition Table, Element ID 808. It is sent to Store Server 36 for forwarding to Central Server 10 where it is placed in a table with the same format. Record Type Flag 392 is a constant and is generated by Application 152 in Point-of-Sale Terminal 50. Customer ID 394 is extracted from the FIG. 24 Customer Session Table, as are: Store ID 398, Point-of-Sale Terminal ID 400, and Session Number 402. Screen ID 404 and Selection ID 406 are extracted from the current Customer Dialog Block 61. Time Stamp 408 is generated from the Customer Interface Micro-processor's 172 Internal Clock 173.

FIG. 20. Is an Instrumentation Table 410 that describes a collection of Screen Instrumentation Messages 370 and Customer Selection Instrumentation Messages 390. Record Type Flag 412 distinguishes between these. The FIG. 20 Instrumentation Table is generated by Store Server 36 when it receives Screen Instrumentation Messages 370 and Customer Selection Instrumentation Messages 390 from Point-of-Sale Terminal 50. The Month 428, Day-of-week 430, Time 432, and Time-of-day 434 are calculated from the Time Stamp 388 from the corresponding FIG. 19 Customer Selection Instrumentation Message or FIG. 18 Screen Instrumentation Message by use of a conventional conversion routine. Customer ID 414 is copied from Customer ID 374 or Customer ID 394 depending on the Record Type Flag 372 or Record Type Flag 392 of the instrumentation message associated with the entry. In a similar manner Screen ID 424 is copied from Screed ID 384 or Screen ID 404, and Screen Size 426 is copied from Screen Size 386 or set to null depending on the record type or record type flag of the instrumentation message associated with the entry.

FIG. 21. Profile Generation Instrumentation Table 440 is a copy of the FIG. 20 Instrumentation Table that is used to generate Customer/Store Profile Tables 120. That process is described under FIG. 23 below. The corresponding fields for FIG. 20 are copied into Record Type Flag (Screen or Customer Selection) 442, Customer ID 444, Store ID 448, Point-of-Sale Terminal ID 450, Session Number 452, Activity ID 454, Screen Size 456, Month 460, Day-of-week 462, Time 464, and Time-of-day (Morning, Mid-day, Evening . . . ) 466.

FIG. 22. Is Point-of-Sale Terminal Table 500 that associates a Screen ID 504 with a Point-of-Sale Terminal ID 502. That screen is presented at End of Session 1016 at Point-of-Sale Terminal Type 503, which indicates the type of usage of the terminal. These types indicate the usage characteristics of the terminal. In a grocery store types might include: 15 item express lane; 9 item express lane; 9 item, cash-only express lane; and standard lane.

FIG. 23. Is Store Profile Table 510. It is supplied from Central Server 10 as part of a periodic download process. Store ID 512 is a unique identifier assigned by Central Server 10 when the store is added to the system. Point-of-Sale Terminal ID 514 identifies Point-of-Sale Terminal 50 in the store that the specific profile applies to. For example the Express Checkout Lane in a store would have a different FIG. 23 Store Profile Table entry than the normal Checkout Lanes. Date Created entry 516 is assigned by Central Server 10 when the store is added to the system. Date of Last Update entry 518 is the date when the current profile was generated. It is set by Central Server 10 during Profile Generation. Mean of Think Time entry 520 is set during FIGS. 43A and 43B Store Profile Generation by averaging the time differences between Time 432 in the FIG. 20 Instrumentation Table for Message Type 412–'Screen' and in the next Time 432 for Message Time 412='Customer Selection' for the FIG. 20 Instrumentation Table for entries with the same Point-of-Sale Terminal ID 420 and Store ID 418. This is done by sorting the FIG. 20 Instrumentation Table into ascending sequence by Store ID 418, Point-of-Sale Terminal ID 420, Month 428, Day-of-week 432 and Time 434 and summarizing from the sorted table. The Std. Deviation of Think Time 522 is similarly calculated using the well-known formulas for calculation of the standard deviation of a set of numbers. The Number of Think Time Samples 524 is the count of samples used to calculate Mean of Think Time 520. A number of fields are repeated for morning, midday, and evening for each day of the week. The weekly information is repeated for each month. The data elements repeated are: Mean Idle Time 532, Std. Deviation of Idle4 Time 534, Number of Idle Time Samples 536, $1^{st}$ most likely Activity ID 538, $2^{nd}$ most likely Activity ID 540, and $3^{rd}$ most likely Activity ID 542.

Mean Idle Time 532, Std. Deviation of Idle Time 534, Number of Idle Time Samples 536 can be calculated by sorting the FIG. 20 Instrumentation Table into ascending sequence by Store Id 418, Point-of-Sale Terminal ID 420, Customer ID 414, Session Number 422, Month 428, Day-of-week 430k, and Time-of-day 434 and summarizing from the sorted table. The difference between the time of the first and last entries in the FIG. 20 Instrumentation Table for a given Session Number 522, less the time between the presentation of the Payment Screen and receiving the Customer Selection, is the idle time for that Customer Session 422. These individual idle times are used to calculate the Mean Idle Time 532, Std. Deviation of Idle Time 534 and Number of Idle Time Samples 536. $1^{st}$ most likely Activity ID 538, $2^{nd}$ most likely Activity ID 540, and $3^{rd}$ most likely Activity ID 542 are generated as described in FIGS. 43A and 43B Store Profile Generation.

Home Screen ID 550 is extracted from the FIG. 22. Point-of-sale Terminal Table by finding the entry that matches Point-of-sale Terminal ID 514. Percent On Time Completion 554 is the percentage of time that the idle time transactions will complete prior to the end of the idle time. It is selected by store management to meet their objectives and is based on their judgment of a correct balance between utilization of customer idle time and utilization of the checkout counter for the primary business of the store.

FIG. 24. Is the Customer Session Table 560 that is constructed as shown in FIG. 44. Customer Session at the point the customer is identified during Checkout Idle Time 1010. It contains Session Number 564 which is set from Next Session Number 564. Customer ID 566 is provided by the customer, generally by passing an identification card Magnetic Stripe Reader 28. Store Subset—Customer Store Profile Table 290 is located by using Customer ID 294 to find the entry, and the time from Customer Interface Microprocessors 172 internal Clock 173 is used to locate: Mean Idle Time 306, Std. Deviation of Idle time 308, $1^{st}$ most likely Activity ID 310, $2^{nd}$ most likely Activity ID 312, and $3^{rd}$ most likely Activity ID 314, which are entered into the corresponding fields of the FIG. 24 Customer Session Table 560.

FIG. 25. Is the Time-of-day Conversion Table 580 that is used to convert a clock value from the time of day in terms of Morning, Mid-day, and Evening.

Time Morning Start 582 is the clock value that defines the start of Morning. Any clock value between Time Morning Start 582 and Time Mid-day Start 584 is Morning. Any clock value between Time Mid-day Start 584 and Time Evening Start 586 is Mid-day. Any clock value between Time Evening Start 586 and Time Morning Start 582 is Evening. Note: this table is readily expanded to handle more than three time periods per day.

FIG. 26. Is Proposed Activity List 590 to be presented to a customer. The FIG. 26 Proposed Activity List elements Activity ID 592, Expected System Response Time 594, Expected Std. Deviation of System Response Time 596, and Activity Value 598 are copied from the respective fields of FIG. 27 Activity Table. The first three entries are $1^{st}$ most likely Activity ID 572, $2^{nd}$ most likely Activity ID 574 and $3^{rd}$ most likely Activity ID 5726; followed by the rest of the entries in the FIG. 27 Activity Table In descending Activity Value 598 order. Then, based on Expected Idle Time 570 from the FIG. 24 Customer Session Table, the Expected system Response Time 594 and the Expected Std. Deviation of System Response Time 606 from the FIG. 27 Activity table, and Mean Think Time 296 and Std. Deviation of Think Time 298 from the FIG. 14 Store Subset—Customer/Store Profile Table; the FIG. 26 Proposed Activity List is purged of activities beyond the entry that will satisfy the Percent On Time Completion 554 criteria from FIG. 23. See FIG. 42 Selection of Proposed Activity for a flow chart implementation of this.

FIG. 27. Is the Activity Table 600 that has all the activities offered in the store. It contains Activity ID 602 and Screen ID 604, which is a Screen ID 202 for a first screen in an Activity 200; and Activity Value 608, which is value to the business entities that are involved in the offering associated with the activity. Activity Type 610 identifies the type of activity. Some of the activities included advertisements, information presentations, product offers, service offers, information queries . . . This allows the system to offer a broad range of activities, including the sale of products and services. Activity Price 612 permits the presentation of the price to the customer.

FIG. 28. is a Screen Definition Table 800 that is the anchor point for the generation of a screen. It is composed of: a Screen ID 802 which is a unique identifier assigned by Central Server 10 during the screen definition process; an X Dimension 804 arid a Y Dimension 806 that define the size of the screen to be presented; a list of Sub-screen Elements composed of entries from the FIG. 29. Text Element Table, FIG. 30. Graphic Element Table, FIG. 31. Touch Element Table and FIG. 32. Key Pad Element Table. These are described below.

FIG. 29. is the Text Element Table 820, which is composed of: Text Element ID 822, a unique identifier assigned by the Central Server 10 and downloaded into the Store Server 36 periodically; a Text Element Flag 824 which is used to identify an entry as a text element when it is copied into the FIG. 28. Screen Definition Table; an X Position 826 and a Y Position 828 that specify the upper leftmost location on the screen where the text is to be placed; Font 830 which specifies which type font to use when displaying the text; Style 832 (Bold, Underlined, Italic . . . ) of font to use for the text; Length 834 in bytes of the following field which contains the text; and Text 836 which contains the text to be displayed.

FIG. 30. is the Graphic Element Table 840, which is composed of: Graphic Element ID 842, a unique identifier assigned by Central Server 10 and downloaded into Store Server 36 periodically; a Graphic Element Flag 844 which is used to identify an entry as a graphic element when it is copied into the FIG. 28. Screen Definition Table; an X Position 846 and a Y Position 848 that specifies the upper leftmost location on the screen where the text is to be placed; the Graphic's Type 850 (tiff, GIF . . . ) which specifies the format of the graphic; Size 852 of Graphic 854 in bytes; and Graphic 854 which contains the graphic to be displayed.

FIG. 31. is the Touch Element Table 860, which is composed of: Touch Element ID 862, a unique identifier assigned by Central Server 10 and downloaded into Store Server 36 periodically; a Touch Element Flag 864 which is used to identify an entry as a touch element when it is copied into the FIG. 28. Screen Definition Table; an X1 Coordinate 866 and a Y1 Coordinate 868 that specify the upper leftmost location on the screen that is to be active as a touch area, which in conjunction with the X2 Coordinate 870 and Y2 Coordinate 872 that specify the lower rightmost location on the screen that is to be active as a touch area, define a touch area, which if touched by the customer is associated with Selection ID 874 which uniquely identifies the customer response.

FIG. 32. is the Key Pad Element Table 880, which is composed of: Key Pad Element ID 882, a unique identifier assigned by Central Server 10 and downloaded into Store Server 36 periodically; a Key Pad Element Flag 884, which is used to identify an entry as a key pad element when it is copied into the FIG. 28. Screen Definition Table; a Key ID 886 which if touched by the customer is associated with Selection ID 874 which uniquely identifies the customer response.

FIG. 33. Is the Activity Work Table 900 which is composed of Activity ID 902, Count 904 and a time stamp. The time stamp is composed of Month 906, Day of Week 907 and Time of Day 908. It is used to find the most likely activities in the Customer Store Profile Table 240, Store subset—Customer Store Profile Table 290, and Store Profile Table 510. Count 904, Month 906, Day of Week 907 and Time of Day 908 are used in various processes to build FIG. 20, Instrumentation Table 410, and subsequently, FIG. 21, Profile Generation Instrumentation Table 440, FIG. 13, Customer Store Profile Table 240, FIG. 14, Store Subset—Customer Store Profile Table 290, and FIG. 22, Store Profile Table 510.

FIG. 34. Is the Store Configuration Table 910, which is composed of Store ID 912 and Next Session Number 914. Next Session Number 914 is initialized with the value of zero. It is incremented by one, each time a Session Number 564 in the FIG. 24 Customer Session Table is assigned. When the field overflows, it is reset to zero. The field size is picked such that Session Numbers 914 assigned in one 24-hour period are unique. System Response Time 916 is calculated dynamically as shown in FIG. 46 System Response Time Calculation. The Store Configuration Table 910 is built by Store Server 36 at system bring up. This table is in Store Server 36 and has one entry for the store. Std. Deviation of System Response Time 918, Total of Response Times 920, Sum of Square of Response Times 922, and Number of Samples 924 are working values used to update System Response Time 916 as additional samples become available.

FIG. 35. System Response Time Work Table 930, which is composed of: Point-of-Sale Terminal ID 932 which identifies the terminals in the store where the table is sited; Time of Last Customer Response Instrumentation Signal 934; Time of Last Screen Instrumentation Signal 936; Number of Samples 938 of System Response Time; Total of Response Times 940; Sum of Square of Response Times 9542; and System Response Time 944. This table is in Store Server 36 and has one entry for each Point-of-Sale Terminal 50 in the store. Std. Deviation of System Response Time 928, Total of Response Times 920, Sum of Square of Response Times 922, and Number of Samples 924 are working values used to update System Response Time 916 as additional samples become available.

ACTIVITY DIAGRAMS

FIG. 36. Customer Session 1000, is a diagram that describes a typical FIG. 36. Customer Session in a supermarket. It will be explained in the terms of a grocery store but applies with minor variations to most if not all Point-of-sale venues. This diagram illustrates the normal flow of a customer in a store. The first customer activity is to Shop 1002. When the shopping list has been filled, the customer enters a Wait For Checkout 1004. Eventually the customer reaches the point where he/she can Unload Shopping Cart 1006 and after having done so will Wait for Checker 1008. Once the checker is available and starts to process the order, the customer enters Checkout Idle Time 1010. When all the items have been rung up, the customer is asked to Make Payment 1012. After this is completed the customer has a Bagging Idle Time 1014 and then proceeds to vacate the checkout counter at End of Session 1016. Checkout Idle Time 1010 and Bagging Idle Time 1014 constitute the time available (Idle Time) for the customer to engage with the Customer Interface 22 to perform other transactions.

FIG. 37. is a diagram that describes how the Customer Idle Time 1020 is used. The system proposes a series of transactions (Activity 1 1022, Activity 2 1022 through Activity n 1022. These activities are selected based on the Expected Idle Time 570 for the FIG. 36. Customer Session. That Expected Idle Time is calculated as shown in FIG. 41. The selection of the Activities is described in FIG. 42.

FIG. 38. is a diagram that describes the Customer Activity Cycle 1030. The FIG. 38. Customer Activity Cycle is composed of one or more Actions 1032. These Actions 1032 involve the presentation of a Screen 210 with a set of Selections 874 that constitute the customer's response to the screen. The FIG. 38. Customer Activity Cycle starts with the 'Start of Idle Time' in the FIG. 17. Idle Time Message and ends with the 'End of Idle Time' in the related FIG. 17. Idle Time Message.

FIG. 39. is a diagram that describes Customer Action Cycle 1040. The FIG. 39. Customer Action Cycle is viewed from the customer's perspective in that it starts with a screen displayed on the Customer Screen 210. The customer reads and thinks about the information presented during Think Time 1042. Once a decision is made the customer responds during Enter Response 1044. The system evaluates the response which is in the form of a Selection ID 874 and then at the end of System Response Time 1046, Presents Action Alternatives 1048 in the form of next Screen 210 to the customer by selecting a Screen ID 66, 70, 74 . . . associated with Selection ID 64, 68, 72 . . . in the Customer Dialog Block 61. This cycle repeats for each Action 1032 in the FIG. 38. Customer Activity Cycle.

FLOW CHARTS

FIG. 40. Is a flow chart for Detecting Start and End of Idle Time. The flow chart illustrates a portion of the main loop in a conventional cash register. Each time a clerk takes an action, the Process Clerk Action Ring Up 1062 step is performed, then a test is made in the First Ring Up After Receipt? 1064 decision step. If the answer is 'Yes', Step 1066 sends a message to the Store Server 36 via the LAN 1068 containing FIG. 176 Idle Time Message with a Message ID 362 indicating 'Start of Idle Time', and then returns the flow to Step 1070. If the answer generated in Step 1064 was 'No', flow continues to Acquire Next Clerk Action 1070 and then on to End of Transaction 1072, where the decision is made as to whether the next action is the end of the current customer's transaction. If yes, control flows to Step 1074 which sends a message to the Store Server 36 via the LAN 1068 containing FIG. 17 Idle Time Message with a Message ID 362 indicating 'End of Idle Time', and then returns the flow to Process Clerk Action 1062. Otherwise, flow goes directly to Process Clerk Action 1062, where the normal checkout processing is performed for the action.

FIG. 41. is a flow chart describing the calculation of Expected Idle Time 570 (FIG. 24.). In step 1080, using the Customer ID 566 from Customer Session Table 560, Store Subset—Customer Store Profile Table 290 and Time-of-Day, Current-Day, Current-Month (derived from the current time): Then the Number Of Standard Deviations required to meet and Percent On Time Completion 554 is calculated using standard statistical formulas. The square root value is multiplied by Std. Deviation of Idle Time 534 for the Time-of-Day, Current-Day, and Current-Month. The product is added to the Mean Idle. Time 532 for the Time-of-Day, Current-Day, and Current-Month, giving Expected Idle Time 570.

FIG. 42. Is a flow chart describing the construction of Selection of Proposed Activities 1090. Step 1090, using FIG. 41, calculates Expected Idle Time 570. Step 1092 builds a new instance of a Proposed Activity List 590 for this customer session and primes the table with the activities from the Activity Table 600. Step 1094 inserts the three most likely activities from the Subset Customer/Store Profile 290 or Store Profile Table 510 (if the Subset Customer/Store Profile 290 for Customer ID 566 does not exist) into the head of the Proposed Activity List 590. Step 100 sets the Activity-List-Pointer (it points to the 'current' item in the list) to the first item in the Proposed Activity List 590 and initializes Cumulative Time to Zero. Then Step 1104 sets up a loop to process all the entries in the proposed Activity List 590 and passes control to Step 1106.

Step 1106 sums the time taken for the current Activity 1022 by adding: the product of Mean of Think Time 520 and the number of Actions 1032 in the Activity 1022, and Expected System Response Time 594 to Cumulative-Time.

Step 1108 tests Cumulative-Time to see if it exceeds the Expected Idle Time 570. If it does, the control is passed to Step 1110; otherwise control passes to Step 1112.

Step 1110 is executed in the case where the last activity did not fit into Expected Idle Time 570. The calculation in Step 1106 is nullified and the current Activity is deleted from the Proposed Activity List 590. This makes the next activity the current activity, so control is passed to Step 1114.

Step 1112 sets the-Activity-List-Pointer to the next Activity on the List.

Step 1114 checks to see if the last activity has been processed. If so the process is ended. Otherwise, i.e. if NO, control is passed to Step 1106, continuing the process.

Figure 43A:
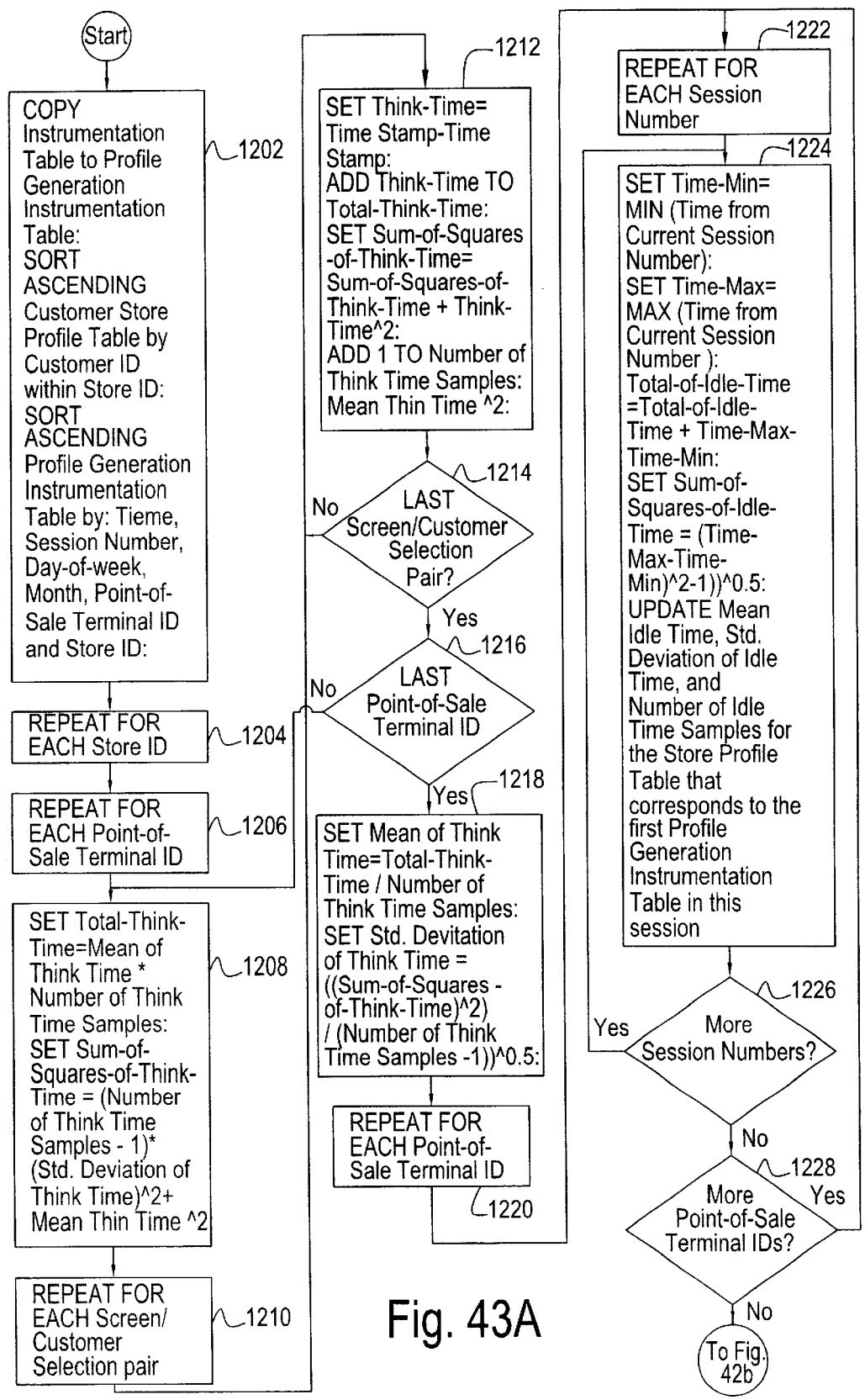
FIG. 43A. Is a flow chart describing the Store Profile Table Generation.

FIG. 43A Store Profile Table Generation 1110 describes how the FIG. 23 Store Profile Table is constructed.

Step 1200 copies Instrumentation Table 410 to Profile Generation Instrumentation Table 440, sorts the: Store Profile Table 240 into ascending sequence by Store ID 246; and then sorts Profile Generation Instrumentation Table 440 into ascending sequence by: Time 464, Session Number 452, Day-of-week 462, Month 460, Point-of-Sale Terminal ID 450, and Store ID 448.

Step 1202 sets up a loop to scan the to Profile Generation Instrumentation Table 440 and update the corresponding entries in the Store Profile Table 240.

Step 1204 sets up a loop to look at each Point-of-Sale Terminal ID 450 entry within the current store.

Step 1206 initializes a temporary variables: Total-Think-Time to Mean to Think Time 520*Number of Think Time Samples 524, and Sum-of-Squares-of-Think-Time= (Number of Think Time Samples 524−1)*(Std. Deviation of Think Time 522)^2+Mean Think Time 520^2; each time a new Point-of-Sale Terminal ID 450 is reached.

Step 1208 sets up a loop to process each pair of Screen Instrumentation Message 370 and Customer Selection Instrumentation Message 390.

Step 1210 initializes a temporary variable: Think-Time= Time Stamp 388 Time Stamp 408, adds Think-Time TO Total-Think-Time, adds Think-Time^2 to Sum-of-Squares-of-Think-Time, and adds 1 to Number of Think Time Samples 524.

Step 1212 checks to see if the last pair of Screen Instrumentation Message 370 and Customer Selection Instrumentation Message 390 within Point-of-Sale Terminal ID 450, has been processed. If not control is returned to Step 1210 to process the next pair. Otherwise control is passed to Step 1214.

Step 1214 checks to see if all the within Point-of-Sale Terminal IDs 450 within the Store ID 448 have been processed. If not control is returned to Step 1206 to process the next pair. Otherwise control is passed to Step 1216.

Step 1216 then calculates Mean of Think Time 520=Total-Think-Time/Number of Think Time Samples 524, Std. Deviation of Think Time 522=((Sum-of-Squares-of-Think-Time−(Total-Think-Time)^2)/(Number of Think Time Samples 524−1))^0.5, adds 1 to Number of Idle Time Samples 536, Mean Idle Time 532=Total-of-Idle-Time/ Number of Think Time Samples 524:

Step 1218 sets up a loop to calculate the Mean Idle Time statistics for Store Profile Table 510.

Step 1222 sets up a loop to process each Session Number 452 in the Point-of-Sale Terminal IDs 450.

Step 1224 calculates temporary variables: Time-Min= MIN(Time 464 from current Session Number 452), Time-Max=MAX(Time 464 from current Session Number 452), Total-of-Idle-Time=Time-Max−Time-Min, and Sum-of-Squares-of-Idle-Time=(Time-Max−Time-Min)^2−1))^0.5. It then updates Mean Idle Time 532, Std. Deviation of Idle Time 534, and Number of Idle Time Samples 536 for the Store Profile Table 510 that corresponds to the first Profile Generation Instrumentation Table 440 for the current session.

Step 1226 checks for more Session Numbers 452 in Profile Generation Instrumentation Table 440. If there are more it transfers control to Step 1224, otherwise to Step 1228.

Step 1228 checks for more Point-of-Sale Terminal Ids 450 in Profile Generation Instrumentation Table 440. If there are more it transfers control to FIG. 43B Step 1222, otherwise to Step 1238.

Figure 43B:
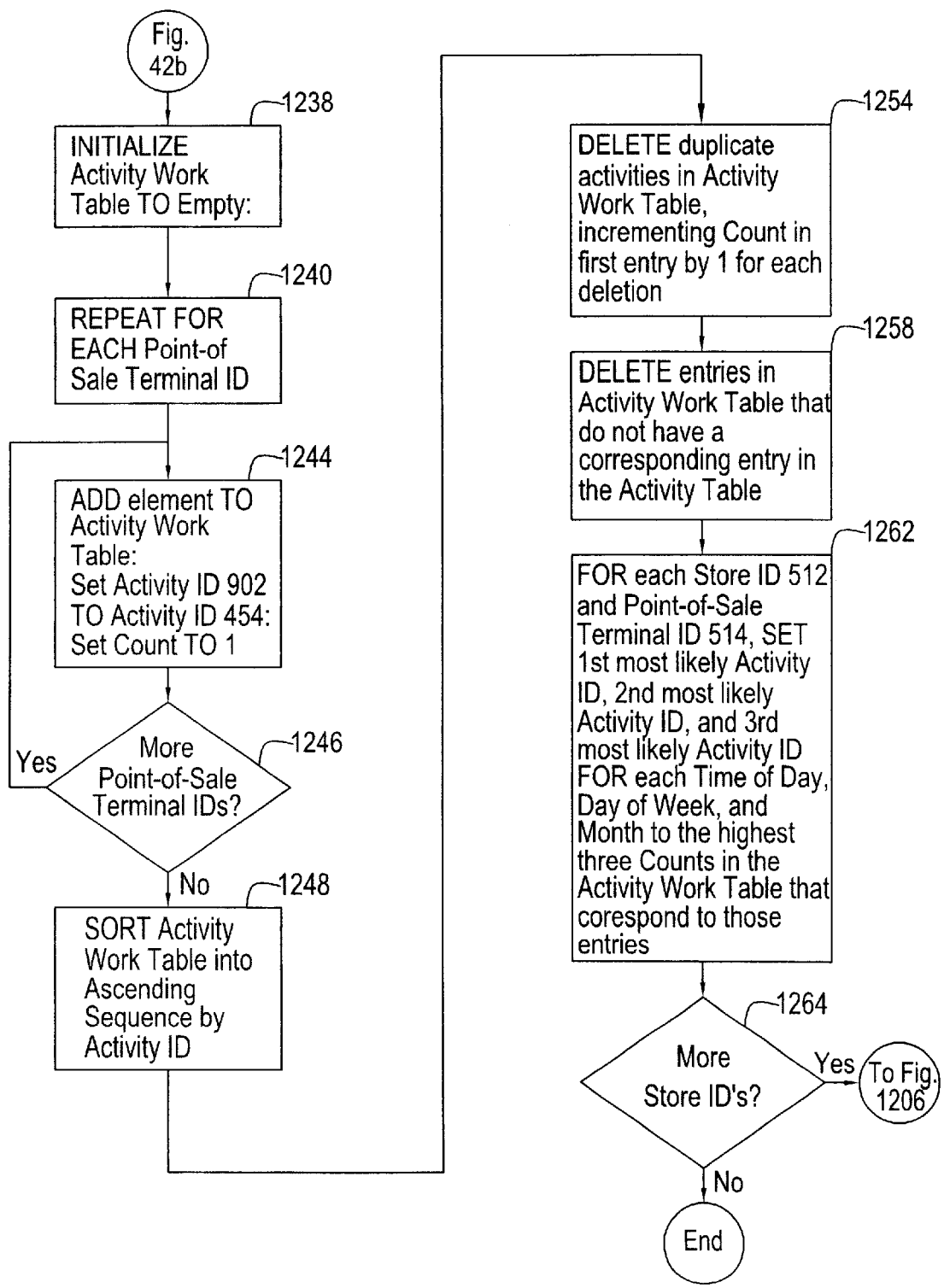
FIG. 43B. Is a continuation of FIG. 43A. Store Profile Table Generation.

FIG. 43B is a continuation of FIG. 43A Store Profile Table Generation 1110.

Step 1238 initializes Activity Work Table 900 to empty.

Step 1240 sets up a loop to look at each Point-of-Sale Terminal ID 450 entry within the current store.

Step 1244 adds a new element to Activity Work Table 900 by setting the next available element as follows: Activity ID 902 Activity ID 454, Count 904=1.

Step 1246 checks for more Point-of-Sale Terminal IDs 450 in Profile. Generation Instrumentation Table 440. If there are more it transfers control to Step 1244, otherwise to Step 1248.

Step 1248 sorts Activity Work Table 900 into Ascending Sequence by Activity ID 902.

Step 1254 deletes duplicate elements in Activity Work Table 900 preserving the first duplicate activity to appear in the table and adding 1 to the Count 904 for each deletion.

Step 1258 deletes elements in Activity Work Table 900 that do not have corresponding elements in the Activity Table 600.

Step 1262 updates Store Profile Table 240 for each Store ID 512 and Point-of-Sale Terminal ID 514, setting 1st most likely Activity ID 538, 2nd most likely Activity ID 540, and 3rd most likely Activity ID 542 for each Time of Day, Day of Week, and Month to the highest three Counts 904 in the Activity Work Table 900 that correspond to those entries.

Step 1264 checks for more Store ID in Profile Generation Instrumentation Table 440. If there are more it transfers control to [FIG. 42A-1,]Step 1204, otherwise it ends the process.

FIG. 44. Customer Session Table Generation 1120 describes how the FIG. 24 Customer Session Table is constructed.

Step 1300 receives the Idle Time Message 360 which is the trigger to build a Customer Session Table 560 entry.

Step 1302 checks Message ID 362 for 'Start of Idle Time' and passes control to Step 1304 if it is, otherwise to End.

Step 1304 sets Point-of-sale Terminal ID 562 to Point-of-sale Terminal ID 364, reads Customer ID 566 from Customer Interface 22, sets Session Number 564=Next Session Number 914, and adds 1 to Next Session Number 914.

Step 1306 uses Customer ID 566, Current-Month, Current-Day, Current-Time-of-Day TO FIND Store Subset—Customer Store Profile Table 290 entry, or if the Customer ID 566 is anonymous, finds Store Profile Table 510.

From that entry setting: Expected Idle Time 570=Mean Idle Time 306 or 532, and moving 1st, 2nd and 3rd most likely Activity IDs 310, 312, and 314 or 538, 540 and 542 to the corresponding entries (572, 574, and 576) in the Customer Session Table 560. It then ends the routine.

Figure 45A:
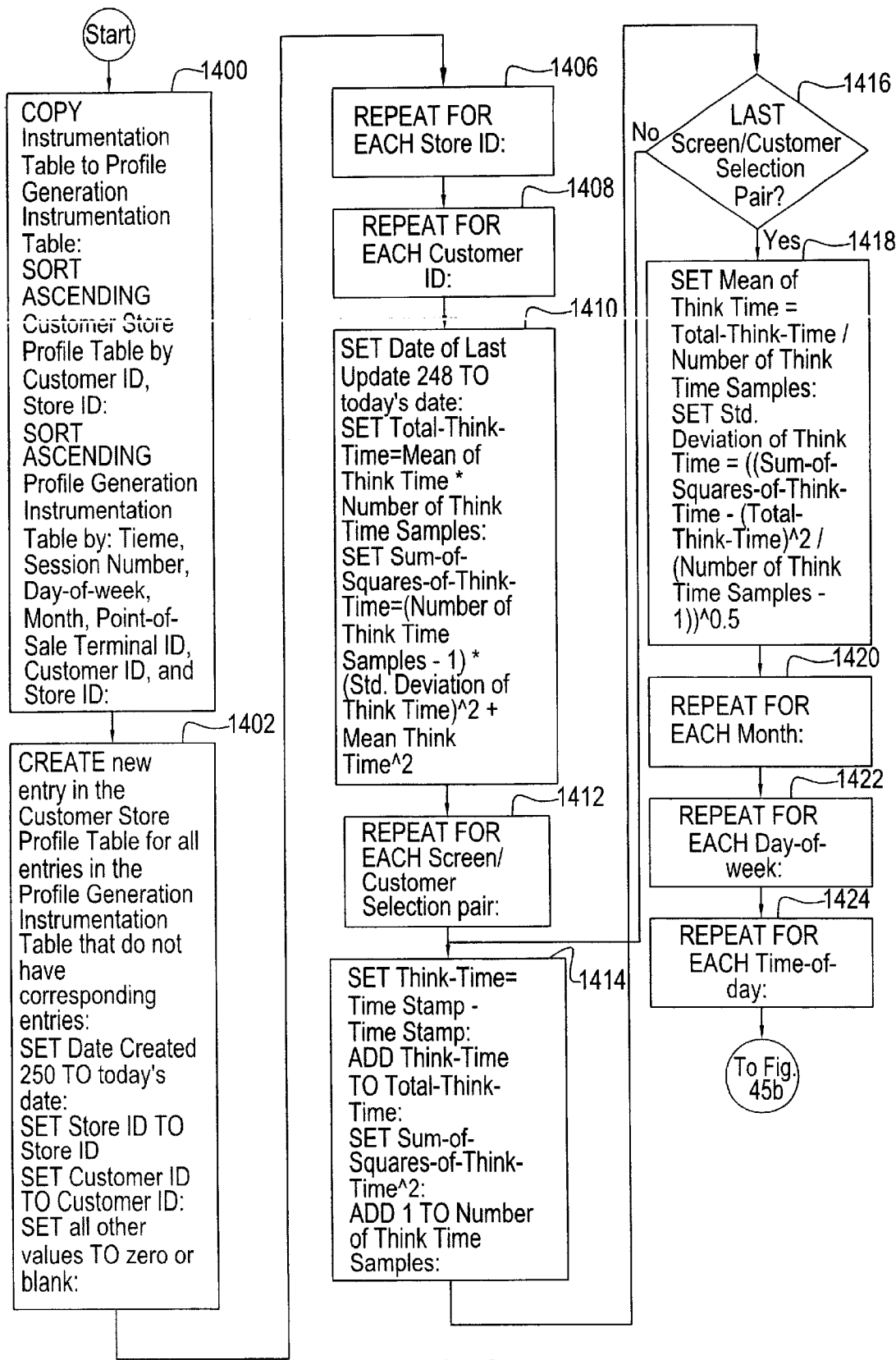
FIG. 45A. Is a flow chart describing the Customer Store Profile Table Generation.

FIG. 45A Customer Store Profile Generation 1140 describes how the FIG. 13 Customer Store Profile Table is constructed.

Step 1400 copies Instrumentation Table 410 into Profile Generation Instrumentation Table 440, sorts Customer Store Profile Table 240 by: Customer ID 242, and Store ID 246 into ascending sequence: sorts Profile Generation Instrumentation Table 440 by: Time 464, Session Number 452, Day-of-week 462, Month 460, Point-of-Sale Terminal ID 450, Customer ID 444, and Store ID 448.

Step 1402 creates a new entry in Customer Store Profile Table 240 for all entries in the Profile Generation Instrumentation Table 440 that do not have an entry in the Customer Store Profile Table 240, setting Date Created 250 to today's date, sets Store ID 246 to Store ID 448, Customer ID 242 to Customer ID 444, and all other values to zero or blank:

Step 1406 sets up a loop to look at each Store ID 448 entry in Profile Generation Instrumentation Table 440.

Step 1408 sets up a loop to look at each to Customer ID 444 entry in each Store ID 448.

Step 1410 sets Date of Last Update 248 to today's date, temporary variables: Total-Think-Time=Mean of Think Time 252*Number of Think Time Samples 256, and Sum-of-Squares-of-Think-Time=(Number of Think Time Samples 256−1)*(Std. Deviation of Think Time 254)^2+ Mean Think Time 252^2.

Step 1412 sets up a loop to look at each Screen Instrumentation Message 370, Customer Selection Instrumentation Message 390 pair in Profile Generation Instrumentation Table 440 for Customer ID 444.

Step 1414 sets temporary variable Think-Time to Time Stamp 408—Time Stamp 388, adding Think-Time to Total-Think-Time, Sum-of-Squares-of-Think-Time to Sum-of-Squares-of-Think-Time+Think-Time^2, and adding 1 to Number of Think Time Samples 256.

Step 1416 check to see if all pairs have been processed. If not, control is passed to Step 1414, other wise to Step 1418.

Step 1418 sets Mean of Think Time 252 to Total-Think-Time/Number of Think Time Samples 256, sets Std. Deviation of Think Time 254=((Sum-of-Squares-of-Think-Time-(Total-Think-Time)^2)/(Number of Think Time Samples 256−1))^0.5:

Steps 1420, 1422 and 1424 set up nested loops for Time-of-Day, Day-of-Week, and Month. These loop variables determine which fields in Customer Store Profile Table 240 are used with the loops. Control passes to FIG. 44b. Step 1426.

Figure 45B:
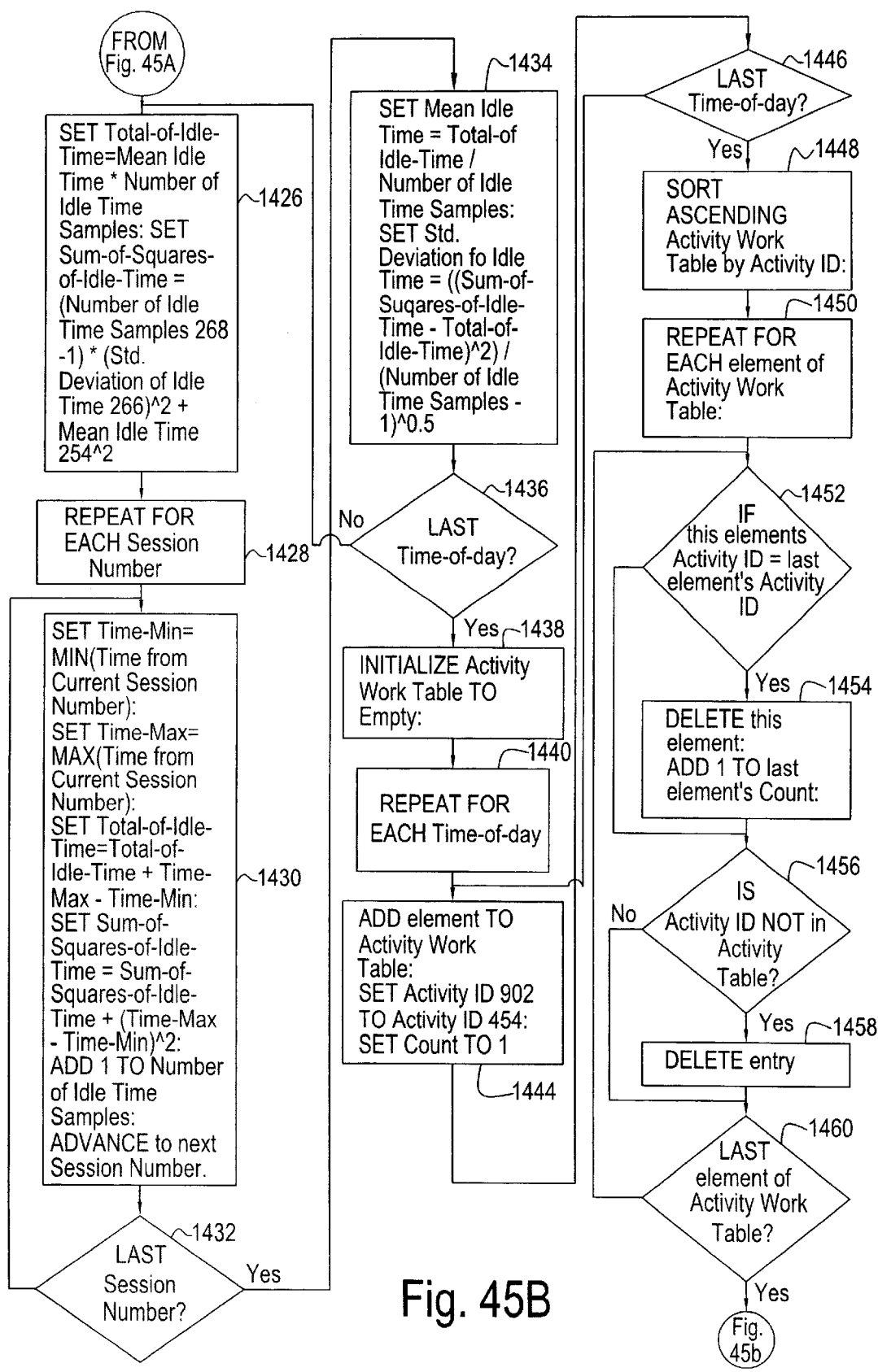
FIG. 45B. Is a continuation of FIG. 45A. Customer Store Profile Table Generation.

FIG. 45B is a continuation of FIG. 45A Customer Store Profile Generation.

Step 1426 sets Total-of-Idle-Time=Mean Idle Time 264*Number of Idle Time Samples 268, Sum-of-Squares-of-Idle-Time=(Number of Idle Time Samples 268−1)*(Std. Deviation of Idle Time 266)^2+Mean Idle Time 254^2.

Step 1428 set up a loop for each Session Number 452 within the Time-of-day inverval.

Step 1430 sets temporary variables: Time-Min=MIN (Time 464 from current Session Number 452 within Profile Generation Instrumentation Table 440), Time-Max=MAX (Time 464 from current Session Number 452 within Profile Generation Instrumentation Table 440), Total-of-Idle-Time= Total-of-Idle-Time+Time-Max−Time-Min, Sum-of-Squares-of-Idle-Time=Sum-of-Squares-of-Idle-Time+ (Time-Max−Time-Min)^2, and adds 1 to Number of Idle Time Samples. It then sets up to process the next session number in the Profile Generation Instrumentation Table 440.

Step 1432 checks to see if all the session numbers in the Profile Generation Instrumentation Table 440 have been processed. If not control passes back to Step 1430, otherwise control passes to Step 1434.

Step 1434 sets Mean Idle Time 264=Total-of-Idle-Time/ Number of Idle Time Samples 268, Std. Deviation of Idle Time 266=((Sum-of-Squares-of-Idle-Time−Total-of-Idle-Time)^2)/(Number of Idle Time Samples 268−1)^0.5.

Step 1436 checks to see if all the Time-of-day intervals in the Profile Generation Instrumentation Table 440 have been processed for the current Day-of-week interval. If not control passes back to Step 1426, otherwise control passes to Step 1438.

Step 1438 initializes Activity Work Table to Empty, and sets temporary variable Last-Activity-ID TO null.

Step 1440 set up a loop for each Time-of-day within Day.

Step 1444 adds a new element to Activity Work Table, setting Activity ID 902, Count 904, Month 906, Day of Week 907, and Time of Day 908 to the corresponding fields in Profile Generation Instrumentation Table 440; setting Count to 1.

Step 1446 checks to see if all the Time-of-day intervals in the Profile Generation Instrumentation Table 440 have been processed for the current Day-of-week interval. If not control passes back to Step 1444, otherwise control passes to Step 1448.

Step 1448 sorts Activity Work Table 900 into ascending sequence by Activity ID 902:

Step 1450 set up a loop for each element in Activity Work Table 900.

Step 1452 checks the current element of Activity Work Table 900 has the same Activity ID 902 as the last element. If yes, control passes to 1454, otherwise control passes to Step 1456.

Step 1454 deletes the current element of the Activity Work Table 900 and adds 1 to the its Count 904.

Step 1456 checks the current element of Activity Work Table 900 to see if its Activity ID 902 is in the Activity Table 600. If yes, control passes to 1458, otherwise control passes to Step 1460.

Step 1458 deletes the current entry in the Activity Work Table 900.

Step 1460 checks to see if the last element in the Activity Work table 900 has been processed. If not, control passes to 1452, otherwise control passes to FIG. 45C Step 1462.

Figure 45C:
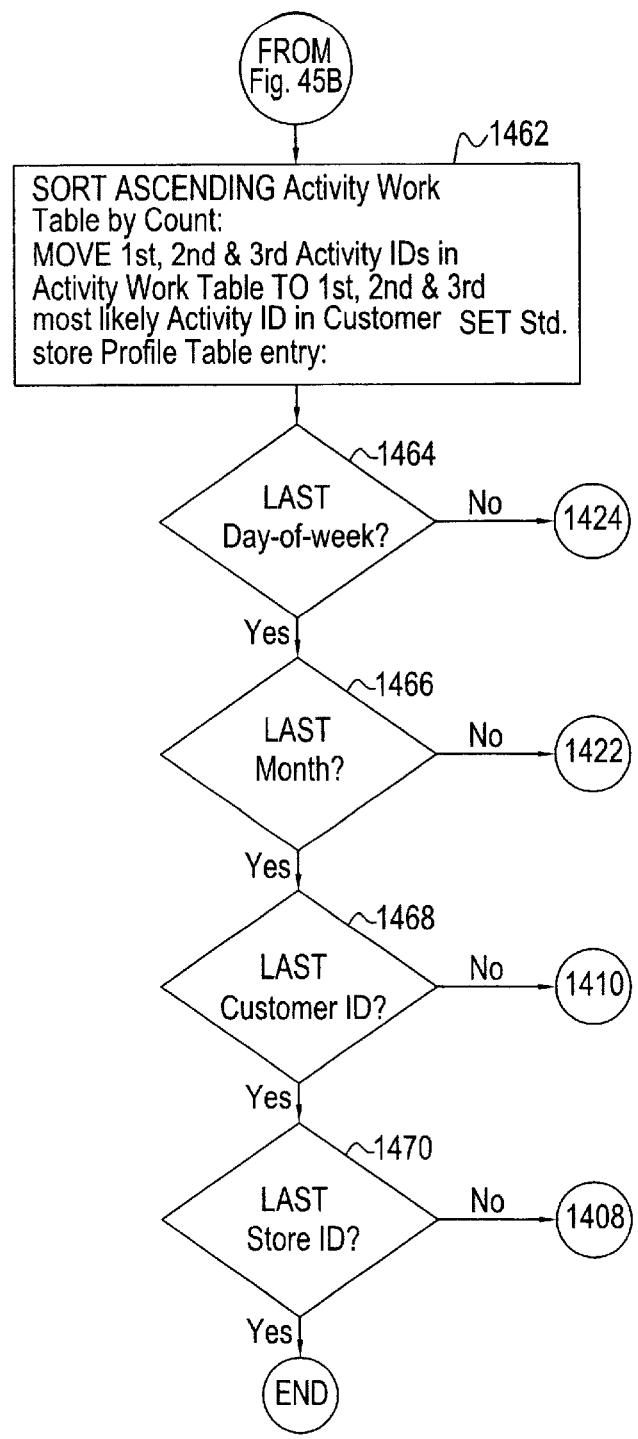
FIG. 45C. Is a continuation of FIG. 45A. Customer Store Profile Table Generation.

FIG. 45C is a continuation of FIG. 45A Customer Store Profile Generation.

Step 1462 sorts Activity Work Table 900 in ascending sequence by Count: 904, moves 1st, 2nd & 3rd elements' Activity IDs 902 from Activity Work Table 900 to 1st, 2nd & 3rd most likely Activity ID 270, 272, & 274; in Customer Store Profile Table 240 entry:

Step 1464 checks to see if the last Day-of-week 462 in Profile Generation Instrumentation Table 440 has been processed. If not, control passes to Step 1424, otherwise control passes to Step 1466.

Step 1466 checks to see if the last Month 460 in Profile Generation Instrumentation Table 440 has been processed. If not, control passes to Step 1422, otherwise control passes to Step 1470.

Step 1468 checks to see if the last Customer ID 444 IN Profile Generation Instrumentation Table 440 has been processed. If not, control passes to Step 1410, otherwise control passes to Step 1470.

Step 1470 checks to see if the last Store ID 448 in Profile Generation Instrumentation Table 440 has been processed. If not, control passes to Step 1408, otherwise the routine ends.

FIG. 46. System Response Time Calculation 1160 describes how System Response Time is calculated.

This routine is a never ending loop.

Step 1500 read either Screen Instrumentation Message 370 or Customer Selection Instrumentation Message 390 from the Customer Interface 22 and inserts it in Instrumentation Table 410.

Step 1502 checks to see if Record Type Flag 442 in Profile Generation Instrumentation Table 440 is equal to 'Customer Selection'. If not, control passes to Step 1506, otherwise control passes to Step 1504.

Step 1504 sets Time of Last Customer Selection Instrumentation Signal 930 to Time 432, using Point-of-sale Terminal ID 450 to select the corresponding entry in System Response Time Work Table 930. It passes control to Step 1500.

Step 1506 checks to see if Record Type Flag 442 in Profile Generation Instrumentation by Table 440 is equal to 'Screen Selection". If not, control passes to Step 1500, otherwise control passes to Step 1508.

Step 1508 sets Time of Last Screen Instrumentation Signal USING Point-of-sale Terminal ID 420 TO select entry in System Response Time Work Table 930. Then adds 1 to Number of Samples 938, setting temporary variable Response-Time=Time of Last Screen Instrumentation Signal 936–Time of Last Customer Response Instrumentation Signal 934, adding Response-Time to Total of Response Time 940, adding: Response-Time^2 TO Sum of Square of Response Times 942, and passes control to Step 1500.

TYPICAL HARDWARE AND SOFTWARE INFRASTRUCTURE

This invention is based on conventional point-of-sale systems. Many manufacturers supply point-of-sale equipment, and the invention is not limited to any particular manufacture's equipment. The invention can be implemented using IBM's 3680 Programmable Store System. The Store Controller 24 being an IBM 3650 and the Point-of-sale Terminal 50 being IBM 3683s.

IBM supplies software (IBM programmable store system MICRCODE) used in controlling operations in the hardware described and a program product (Subsystem Program Preparation Support II (SPPS II)) for writing controller and terminal programs. SPPS II includes languages, macro instructions, and a terminal display language. Communication between the terminals and the store controller is done by using a LAN 30 and a program written in IBM 3650 Programmable Store System Microcode. Other application programs that form the infrastructure for the invention are SDM (Store Data Management) and HCP (Host Communication Program), both sold by IBM.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for selecting one or more activities to be presented to a customer, the system comprising:

at least one terminal for dispatching a customer identifier, for presenting information to the customer and for receiving information from the customer;

a customer database including (i) customer identification data and (ii) customer profile data including preferred activity identifiers, historical information regarding a customer's prior activities with respect to said system and an estimation of a probability that an activity identifier will be selected by a customer;

an activity database including means for configuring interactive, single transaction dialogues;

a server responsive to a customer identifier from said at least one terminal, to access said customer database, to select and order one or more activities, based on said customer profile data, to utilize said activity database to configure a dialogue based on said one or more activities that are selected, to dispatch said dialogue to said terminal for presentation to said customer and to receive responses from said customer, without the customer, having to initiate another transaction;

wherein the server, in selecting a dialog, makes use of historically experienced customer actions for a population of customers in similar venues to a venue of said customer checkout location.

2. A system for selecting one or more activities to be presented to a customer, the system comprising:

at least one terminal for dispatching a customer identifier, for presenting information to the customer and for receiving information from the customer;

a customer database including (i) customer identification data and (ii) customer profile data including preferred activity identifiers, historical information regarding a customer's prior activities with respect to said system and an estimation of a probability that an activity identifier will be selected by a customer;

an activity database including means for configuring interactive, single transaction dialogues;

a server responsive to a customer identifier from said at least one terminal, to access said customer database, to select and order one or more activities, based on said customer profile data, to utilize said activity database to configure a dialogue based on said one or more activities that are selected, to dispatch said dialogue to said terminal for presentation to said customer and to receive responses from said customer, without the customer, having to initiate another transaction;

wherein the server, in selecting a dialog, makes use of historically experienced customer actions for a population of customers in a same venue as a venue of said customer checkout location.

3. A system for selecting one or more activities to be presented to a customer, the system comprising:

at least one terminal for dispatching a customer identifier, for presenting information to the customer and for receiving information from the customer;

a customer database including (i) customer identification data and (ii) customer profile data including preferred activity identifiers, historical information regarding a customer's prior activities with respect to said system and an estimation of a probability that an activity identifier will be selected by a customer;

an activity database including means for configuring interactive, single transaction dialogues;

a server responsive to a customer identifier from said at least one terminal, to access said customer database, to select and order one or more activities, based on said customer profile data, to utilize said activity database to configure a dialogue based on said one or more activities that are selected, to dispatch said dialogue to said terminal for presentation to said customer and to receive responses from said customer, without the customer, having to initiate another transaction;

wherein the server, in selecting a dialog, makes use of a time and day of an action of said customer.

4. The system as recited in claim 3, wherein presentation dialogues comprise offerings of products or services to said customer.

5. The system as recited in claim 4, wherein a customer response to a presentation dialogue comprises an acceptance or a refusal of an offering of a product or a service.

6. The system as recited in claim 4, wherein a customer profile includes historically experienced activities and purchases of said customer.

7. A memory media including instructions for controlling a system to select one or more activities to be presented to a customer, the system including at least one terminal for dispatching a customer identifier for presenting information to the customer and for receiving information from the customer; a customer database including (i) customer identification data and (ii) customer profile data including preferred activity identifiers, historical information regarding a customer's prior activities with respect to said system and an estimation of a probability that an activity identifier will be selected by a customer; an activity database including means for configuring dialogues; and a server, the memory media comprising:

a) means for controlling said server to respond to a customer identifier from said at least one terminal, by accessing said customer database, to select and order one or more activities, based on said customer profile data;

b) means for controlling said server to cause said activity database to configure an interactive, single transaction dialogue based on said one or more activities that are selected;

c) means for controlling said server to dispatch said dialogue to said terminal for presentation to said customer, and without the customer having to initiate another transaction;

d) means for controlling said server to receive responses from said customer and to provide a message to said customer;

wherein means b), in selecting a dialog, makes use of historically experienced customer actions for a population of customers in similar venues to a venue of said customer checkout location.

8. A memory media including instructions for controlling a system to select one or more activities to be presented to a customer, the system including at least one terminal for dispatching a customer identifier for presenting information to the customer and for receiving information from the customer; a customer database including (i) customer identification data and (ii) customer profile data including preferred activity identifiers, historical information regarding a customer's prior activities with respect to said system and an estimation of a probability that an activity identifier will be selected by a customer; an activity database including means for configuring dialogues; and a server, the memory media comprising:

a) means for controlling said server to respond to a customer identifier from said at least one terminal, by accessing said customer database, to select and order one or more activities, based on said customer profile data;

b) means for controlling said server to cause said activity database to configure an interactive, single transaction dialogue based on said one or more activities that are, selected;

c) means for controlling said server to dispatch said dialogue to said terminal for presentation to said customer, and without the customer having to initiate another transaction;

d) means for controlling said server to receive responses from said customer and to provide a message to said customer;

wherein means b), in selecting a dialog, makes use of historically experienced customer actions for a population of customers in same venue as a venue of said checkout location.

9. A memory media including instructions for controlling a system to select one or more activities to be presented to a customer, the system including at least one terminal for dispatching a customer identifier for presenting information to the customer and for receiving information from the customer; a customer database including (i) customer identification data and (ii) customer profile data including preferred activity identifiers, historical information regarding a customer's prior activities with respect to said system and an estimation of a probability that an activity identifier will be selected by a customer; an activity database including means for configuring dialogues; and a server, the memory media comprising:

a) means for controlling said server to respond to a customer identifier from said at least one terminal, by accessing said customer database, to select and order one or more activities, based on said customer profile data;

b) means for controlling said server to cause said activity database to configure an interactive, single transaction dialogue based on said one or more activities that are selected;
c) means for controlling said server to dispatch said dialogue to said terminal for presentation to said customer, and without the customer having to initiate another transaction;
d) means for controlling said server to receive responses from said customer and to provide a message to said customer;
   wherein means b), in selecting a dialog, makes use of time and day of an action of said customer.

10. The memory media as recited in claim 9, wherein presentation dialogues comprise offerings of products or services to said customer.

11. The memory media as recited in claim 10, wherein a customer response to a presentation dialogue comprises an acceptance or a refusal of an offering of a products or a service.

12. The memory media as recited in claim 11, wherein a customer profile includes historically experienced activities and purchases of said customer.

* * * * *